United States Patent
Koide

(10) Patent No.: US 6,914,619 B2
(45) Date of Patent: Jul. 5, 2005

(54) DEVICE FOR DRIVING AN ENDLESS BELT AND IMAGE FORMING APPARATUS USING THE SAME

(75) Inventor: Hiroshi Koide, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 177 days.

(21) Appl. No.: 09/985,741

(22) Filed: Nov. 6, 2001

(65) Prior Publication Data

US 2002/0085086 A1 Jul. 4, 2002

(30) Foreign Application Priority Data

Nov. 6, 2000 (JP) ........................................ 2000-338116

(51) Int. Cl.[7] .............................................. B41J 2/385
(52) U.S. Cl. ...................................................... 347/154
(58) Field of Search ................................ 347/139, 153, 347/154, 262, 264, 215, 217, 218, 134; 198/789–790, 804–805; 399/312, 299, 301, 302, 394; 346/93, 136, 138; 318/432

(56) References Cited

U.S. PATENT DOCUMENTS

| | | | | |
|---|---|---|---|---|
| 5,315,322 A | * | 5/1994 | Bannai | 347/134 |
| 5,321,477 A | * | 6/1994 | Nagata et al. | 399/312 |
| 5,828,937 A | * | 10/1998 | Aerens et al. | 399/301 |
| 5,995,802 A | * | 11/1999 | Mori et al. | 399/394 |
| 5,998,952 A | * | 12/1999 | McLaughlin et al. | 318/432 |
| 6,463,247 B1 | * | 10/2002 | Kawano et al. | 399/299 |
| 6,507,713 B2 | | 1/2003 | Koide | |
| 6,560,434 B2 | * | 5/2003 | Chapman et al. | 399/302 |

FOREIGN PATENT DOCUMENTS

| | | | | |
|---|---|---|---|---|
| JP | 7-210839 | * | 8/1995 | G11B/5/52 |
| JP | 08110669 A | * | 4/1996 | G03G/15/01 |
| JP | 10-260590 | * | 9/1998 | G03G/15/16 |
| JP | 2000227725 A | * | 8/2000 | G03G/15/16 |

OTHER PUBLICATIONS

U.S. Appl. No. 10/634,783, filed Aug. 6, 2003, Matsuda et al., pending.
U.S. Appl. No. 10/663,766, filed Sep. 17, 2003, Takuroh, pending.
U.S. Appl. No. 10/387,506, filed Mar. 14, 2003, Koide et al., pending.

* cited by examiner

Primary Examiner—Hia Pham
(74) Attorney, Agent, or Firm—Oblon, Spivak, McClelland, Maier & Neustadt, P.C.

(57) ABSTRACT

A device for driving an endless belt of the present invention includes a drive roller and a roller pair adjoining the drive roller at a side where a photoconductive element is positioned and contacting the belt. The eccentricity of the drive roller and that of the roller pair are reduced to reduce the variation of belt speed when the drive roller is controlled at a preselected angular velocity. Even when the drum is eccentric, the device stably operates integrally with the belt without any slip or oscillation.

34 Claims, 25 Drawing Sheets

DEVICE FOR DRIVING AN ENDLESS BELT AND IMAGE FORMING APPARATUS USING THE SAME

BACKGROUND OF THE INVENTION

1. Field of the Invention

The present invention relates to a device for driving an endless belt with belt driving means and rotary bodies arranged side by side in the direction of movement of the belt and driven by the belt. Also, the present invention relates to a color copier, color laser printer or similar color image forming apparatus including belt driving means for moving an intermediate image transfer belt or a sheet conveying belt, and photoconductive drums arranged side by side in the direction of movement of the belt and driven by the belt.

2. Description of the Background Art

Today, an ink jet printing system and an electrophotographic printing system are extensively applied to a low-speed and a medium or high speed color image forming apparatus, respectively. Particularly, high-speed color image forming apparatuses included a tandem color copier.

Japanese Patent Laid-Open Publication Nos. 10-246995 and 63-81373, for example, each disclose a tandem color copier including four photoconductive drums arranged side by side on an endless belt in a direction in which a sheet is conveyed. A particular optical scanning unit is assigned to each photoconductive drum. While each drum is in rotation, the associated scanning unit scans the drum with a light beam in the main scanning direction to thereby form a latent image on the drum. A developing unit also assigned to the drum develops the latent image with cyan, magenta, yellow or black toner for thereby forming a toner image. While the belt conveys a sheet via the four drums, chargers sequentially transfer the resulting toner images of four different colors from the drums to the sheet one above the other, thereby forming a full-color image. After the full-color image has been fixed on the sheet, the sheet or full-color copy is driven out to a copy tray.

The tandem color copier described above forms four toner images on four drums in parallel and transfers the toner images to a sheet by passing the sheet only once. This type of color copier is therefore desirable for high-speed color copying.

In the tandem color copier taught in the above Laid-Open Publication No. 10-246995, the conveying speed of the belt and the peripheral speed of each drum are equal to each other. Each drum is scanned in the main scanning direction at a preselected timing. To bring the toner images of different color into accurate register, press rollers press the drums and belt against each other. In this condition, the belt is caused to turn while causing the drums to rotate. The copier using such press rollers, however, have some problems left unsolved, as will be described hereinafter.

So long as the shaft of each drum is free from eccentricity, the angular velocity of the drum remains constant in accordance with the constant conveying speed of the belt. However, if the shaft is eccentric, then the angular velocity is not constant, as will be described in detail later. The copier therefore brings the toner images out of register or distorts the toner images unless consideration is given not only to eccentricity but also to the variation of the angular velocity. This makes it difficult to provide each drum with a diameter accurate enough to implement resolution as high as 1,200 dpi (dots per inch) or above at low cost. The eccentricity of the shaft causes the angular velocity of the drum to vary and cannot be readily coped with by conventional technologies when high resolution is required.

It is a common practice to detect the eccentricity of a photoconductive drum and control the generation of image data such that a latent image is formed on the drum at the same pitch in the subscanning direction. However, the prior art copier of the type using press rollers renders an image irregular in density due to the eccentricity of the drum.

Further, the drum with eccentricity repeatedly presses the belt in a direction perpendicular to the direction of movement of the belt during one rotation thereof. This phenomenon is allowable if the eccentricity of the drum is small. However, if the eccentricity is great and if the drums differ from each other in the phase of eccentricity, then the belt slackens with the result that the belt and each drum slip on each other.

On the other hand, assume that a motor drives a drive roller via gears or a drive transmission belt. Then, there arise other problems including the variation of transmission speed ascribable to the eccentricity of the gears or rollers (or pulleys) holding the belt, oscillation ascribable to the gears meshing with each other, and the deterioration of the rigidity of the belt. In addition, the torque ripples of the motor, for example, are transferred to the drive roller while being amplified by a speed reduction ratio between the gears or the rollers.

In light of the above, Japanese Patent Laid-Open Publication No. 10-63059, for example, proposes to use a gear train for reducing the output speed of a motor and to mount a large flywheel on the shaft of a photoconductive drum, thereby reducing oscillation ascribable to a transmission system. Although this kind of scheme reduces high-frequency oscillation ascribable to, e.g., the gears, it cannot reduce speed variation ascribable to the eccentricity of the gears or effect accurate control due to the deterioration of the rigidity of the driveline.

Japanese Patent Laid-Open Publication No. 6-271130 discloses a conventional arrangement and a single embodiment of so-called direct drive type in which a motor and a drive roller are constructed integrally with each other without the intermediary of a gear train or similar transmission mechanism. In the conventional arrangement, the motor and drive roller are interconnected by a drive shaft. In the embodiment, an outer rotor pulse motor extends over the entire range of the drive roller, which corresponds to the width of a belt, and causes its outer circumference to rotate. The conventional arrangement is susceptible to extraneous oscillation because, considering the torsional oscillation of the drive shaft which is low in rigidity, the gain of a control system cannot be increased. In the embodiment in which the motor is accommodated in the drive roller, heat is transferred to the belt and lowers image quality. Further, the motor accommodated in the elongate drive roller makes production difficult and increases the cost. Image quality is further lowered by the oscillation of the pulse motor.

SUMMARY OF THE INVENTION

It is an object of the present invention to solve the problems discussed above.

It is another object of the present invention to provide a belt driving device that allows a rotary body and an endless belt to stably rotate together without any slip or oscillation.

It is still another object of the present invention to provide an image forming apparatus that allows, even if a photoconductive drum is eccentric, the drum to stably rotate at a constant angular velocity so long as an endless belt turns at a constant speed, thereby insuring accurate register of toner images and obviating image distortion.

It is a further object of the present invention to reduce the oscillation of a mechanism for maintaining the angular velocity of a drive roller constant and the oscillation of a mechanism including a motor that drives the drive roller.

In accordance with the present invention, a device for driving an endless belt includes a belt driving member positioned at one end of the belt and implemented as a first roller for moving the belt. At least one rotary body is arranged side by side in the direction of movement of the belt and pressed against the belt either directly or indirectly to be thereby rotated by the belt. A second roller adjoins the first roller and contacts the belt at a side where the rotary body is positioned. The first roller and second roller each have allowable eccentricity reduced to a range that does not effect the variation of the speed of the belt.

Also, in accordance with the present invention, an image forming apparatus includes a belt driving member positioned at one end of the endless belt, which is either an intermediate image transfer belt or a sheet conveying belt, and implemented as a drive roller for moving the belt. At least one photoconductive drum is arranged side by side in the direction of movement of the belt and pressed against the belt either directly or indirectly to be thereby rotated by the belt. At least one of the drive roller and photoconductive drum is directly driven by an outer rotor coreless motor.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

To better understand the present invention, reference will be made to a specific, tandem image forming apparatus to which the present invention is applied. The image forming apparatus to be described is of the type including an endless belt for conveying a sheet while being pressed against photoconductive drums, and causing the surface of the belt and the surfaces of the drums contacting each other to move without any slip. The endless belt may be replaced with an intermediate image transfer belt, if desired.

Figure 1:
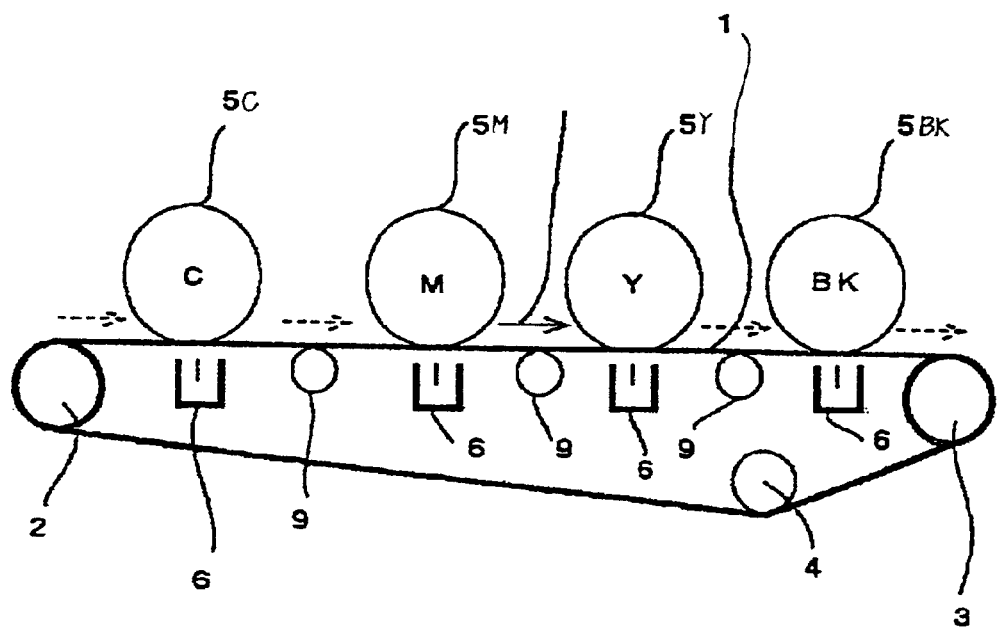
FIG. 1 is a view showing a specific arrangement of photoconductive drums and a conveying section included in a tandem image forming apparatus.

Referring to FIG. 1 of the drawings, a conveying section included in the image forming apparatus is shown. As shown, an endless belt 1 is passed over a drive roller 3, a driven roller 2, and a tension roller 4. Four photoconductive drums 5C, 5M, 5Y and 5BK each face a particular charger 6 with the intermediary of the belt 1. The drums 5C, 5M, 5Y and 5BK are assigned to cyan (C), magenta (M), yellow (Y), and black (BK). The chargers 6 are implemented by corona chargers.

Figure 2:
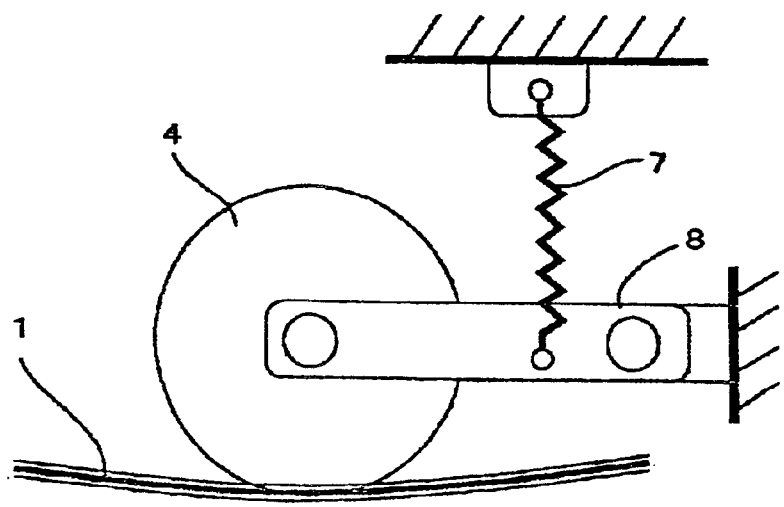
FIG. 2 is a view showing a mechanism for constantly biasing a tension roller included in the conveying section.

As shown in FIG. 2, a spring 7 constantly biases the tension roller 4 toward the belt 1 via a lever 8. In this condition, the tension roller 4 prevents the belt 1 from slackening and causes it to be tangentially pressed against the drums 5C through 5BK.

The specific construction shown in FIG. 1 assumes that a mechanism including the drive roller 3 for driving the belt 1, a belt mechanism and a drive mechanism including a motor that drives the drive roller 3 have no problem. Press rollers 9, which are freely rotatable, each are arranged between nearby drums 5 in order to help the tension roller 4 press the belt 1 against the drums 5. Springs, not shown, bias the press rollers against the belt 1. When a drive motor, not shown, causes the drive roller 3 to rotate at a constant speed, the belt 1 moves at a constant speed to convey a sheet while causing the drums 5 to rotate.

FIG. 1 does not show any one of a document reading section, optical scanning units, a sheet feeder including sheet cassettes, a fixing section, a sheet discharging section, and cleaners chargers and developing units arranged around the drums 5, which are essential with a color copying or printing system. The precondition is that even when any one of the drums 5 is eccentric, the point where the belt 1 and drum 5 contact each other has substantially the maximum value (peak) at the belt side in the cross-section of the drum 5.

A relation between the moving speed of the belt 1 and the angular velocity of each drum 5, which is the basic factor of the construction shown in FIG. 1, will be described hereinafter. There will also be described a method of correcting the misregister of different colors and image distortion ascribable to the eccentricity, scattering in diameter and position of each drum 5.

(1) Relation between Drum Angular Velocity and Belt Speed

Figure 3:
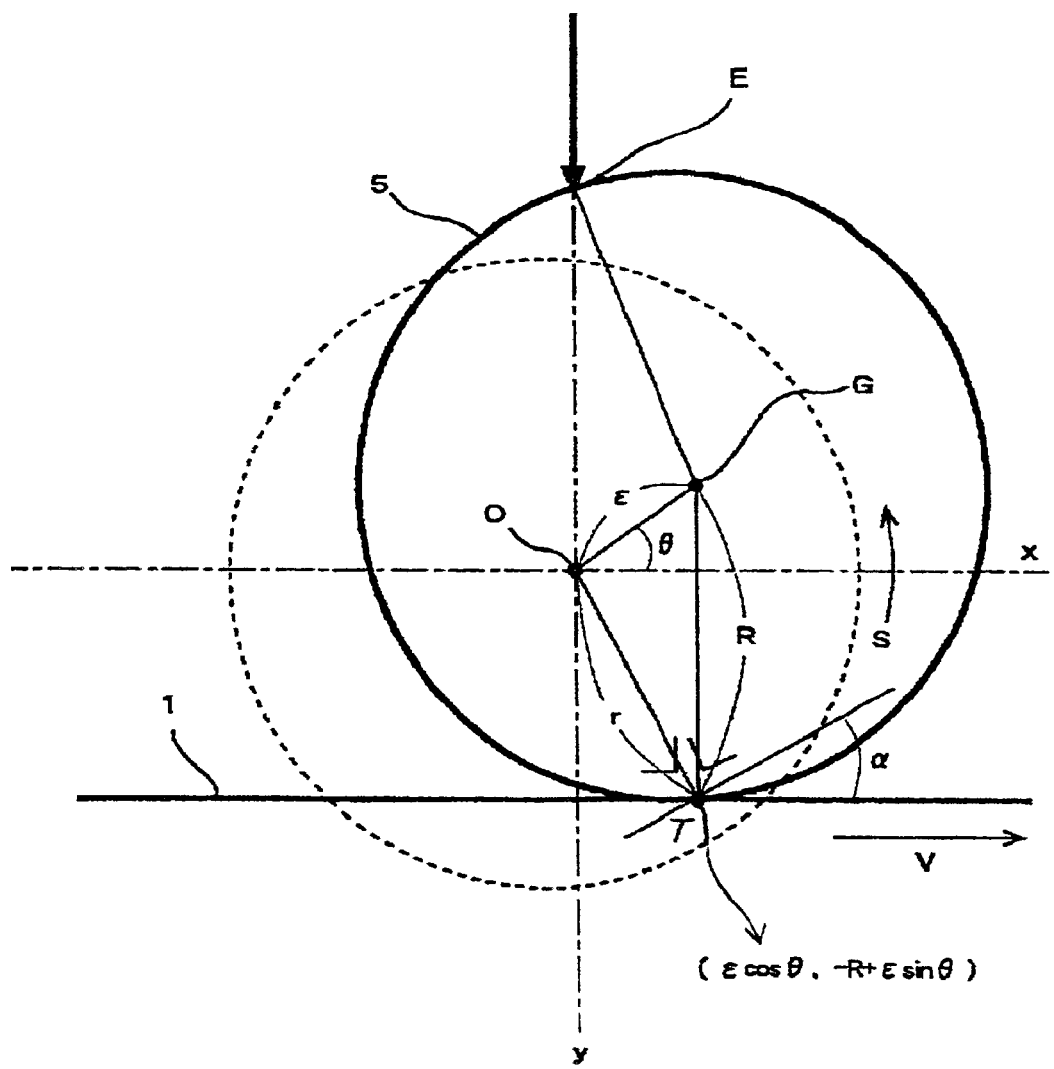
FIG. 3 shows a relation between each drum and a sheet conveying belt.

FIG. 3 models a relation between each drum 5 and the belt 1. As shown, assume that the drum 5 has eccentricity ϵ, and that the angle of an eccentric position G, as measured from an axis x, is θ. Then, the velocity of movement at a point T where the drum 5 and belt 1 contact each other is expressed in terms of coordinates as:

$$(-\varepsilon \sin\theta \cdot \omega, \varepsilon\cos\theta \cdot \omega), \omega = d\theta/dt \qquad \text{Eq. (1)}$$

Therefore, a speed Vs in the direction of rotation S about the center O of the drum 5 is expressed as:

$$Vs = V\cos\alpha - \varepsilon\sin\theta \cdot \omega \cdot \cos\alpha + \varepsilon\cos\theta \cdot \omega \cdot \sin\alpha \qquad \text{Eq. (2)}$$

where V denotes the moving speed of the belt 1, and a denotes an angle between the belt 1 and a line perpendicular to a line r that connects the center O of the drum 1 and point of contact T. ω is therefore produced by:

$$\omega = Vs/r = (V\cos\alpha - \varepsilon\sin\cdot\omega\cdot\cos\alpha + \varepsilon\cos\theta\cdot\omega\cdot\sin\alpha)/r \qquad \text{Eq. (3)}$$

The cosine formula gives:

$$r^2 = R^2 + \varepsilon^2 - 2R\varepsilon\cos(\pi/2 - \theta) = R^2 + \varepsilon^2 - 2R\varepsilon\sin\theta \qquad \text{Eq. (4)}$$

where R denotes the diameter of the drum 5. Here, the sine formula derives:

$$\varepsilon/\sin\alpha = r/\sin(\pi/2 - \theta) = r/\cos\theta \qquad \text{Eq. (5)}$$

$$\sin\alpha = \varepsilon\cos/r, \cos\alpha = (R - \varepsilon\sin\theta)/r \qquad \text{Eq. (6)}$$

By substituting the Eqs. (5) and (6) for the Eq. (3), there is produced:

$$\omega = \{VR - (V + \omega R)\varepsilon\sin\theta + \omega\varepsilon^2\}/(R^2 + \varepsilon^2 - 2R\sin\theta) \qquad \text{Eq. (7)}$$

$$(\varepsilon\sin\theta - R)(V - R\omega) = 0$$

Because ϵ sin θ−R≠0 holds, a relation of V=Rω holds. This means that even if the drum 5 is eccentric, the angular velocity of the drum 5 remains constant without any slip like the speed V of the belt.

Therefore, the angular position of the drum 5 can be estimated without resorting to an encoder capable of sensing the absolute angular position of the drum 5, i.e., if use is made of a sensor responsive to the movement or the absolute position of the belt 1 and a sensor responsive to the reference angular position of the drum 1. The sensor responsive to the movement or the absolute position of the belt 1 may be a linear encoder configured to identify the absolute position by sensing marks positioned at preselected intervals at one end of the belt 1 where a sheet does not pass and a mark representative of the reference position of the belt 1. The sensor responsive to the reference angular position generates a single pulse for one rotation of the belt 1. More specifically, if the linear encoder measures one period of the rotation angle and reference position sensor, then it is possible to determine the rotation angle of the drum 5 for one pulse of the linear encoder. In the case of a system in which the eccentricity of the drive roller 3 is small with respect to required image density and the encoder is not susceptible to its own eccentricity, a rotation angle encoder may be used in place of the linear encoder.

By maintaining the angular velocity of the drum 5 in accordance with the diameter of the drum 5, it is possible to obviate a slip. This, however, does not hold with the conventional configuration shown in FIG. 4 in which the point of contact T between the belt 1 and the drum 5 does not have the maximum value (peak) at the belt side in the cross-section of the drum 5. Specifically, in FIG. 4, the rotation speed of the drum 5 is not constant even if the belt 1 moves at a constant speed.

Figure 4:
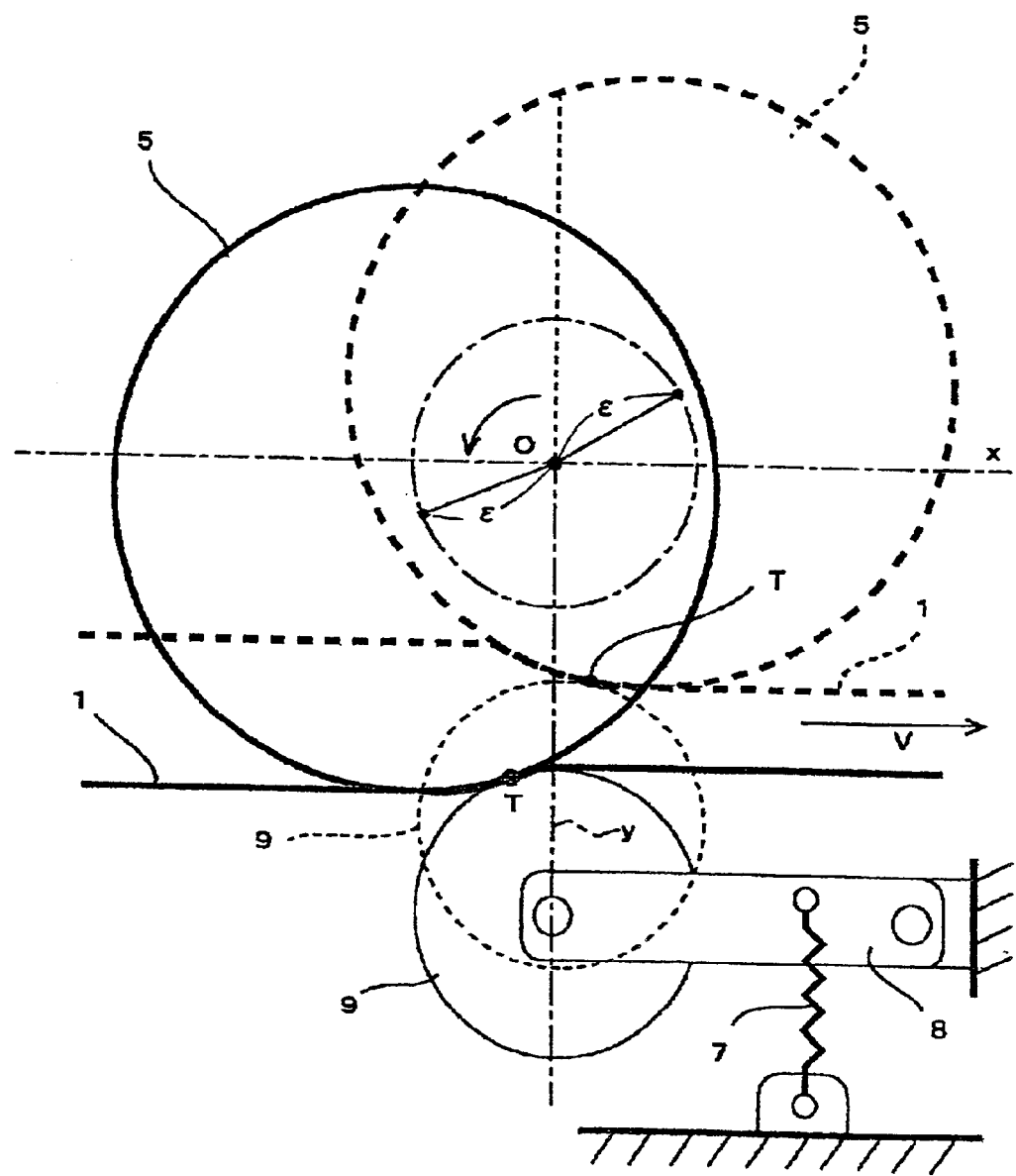
FIG. 4 shows a relation between the drum and the sheet conveying belt or an intermediate image transfer belt.

More specifically, in FIG. 4, a spring constantly biases each press roller 9 against the belt 1 to thereby transfer a driving force from the belt 1 to the drum 5 in the same manner as in FIG. 2. The point of contact T between the belt 1 and the drum 5 is positioned below the axis or center of rotation O of the drum 5, i.e., close to an axis y. As a result, the angular velocity of the drum 5 varies due to eccentricity.

In FIG. 3, E denotes an exposure position, and a dotted line shows the ideal position of the drum 5.

(2) Angle between Exposure Position and Image Transfer Position

Figure 5:
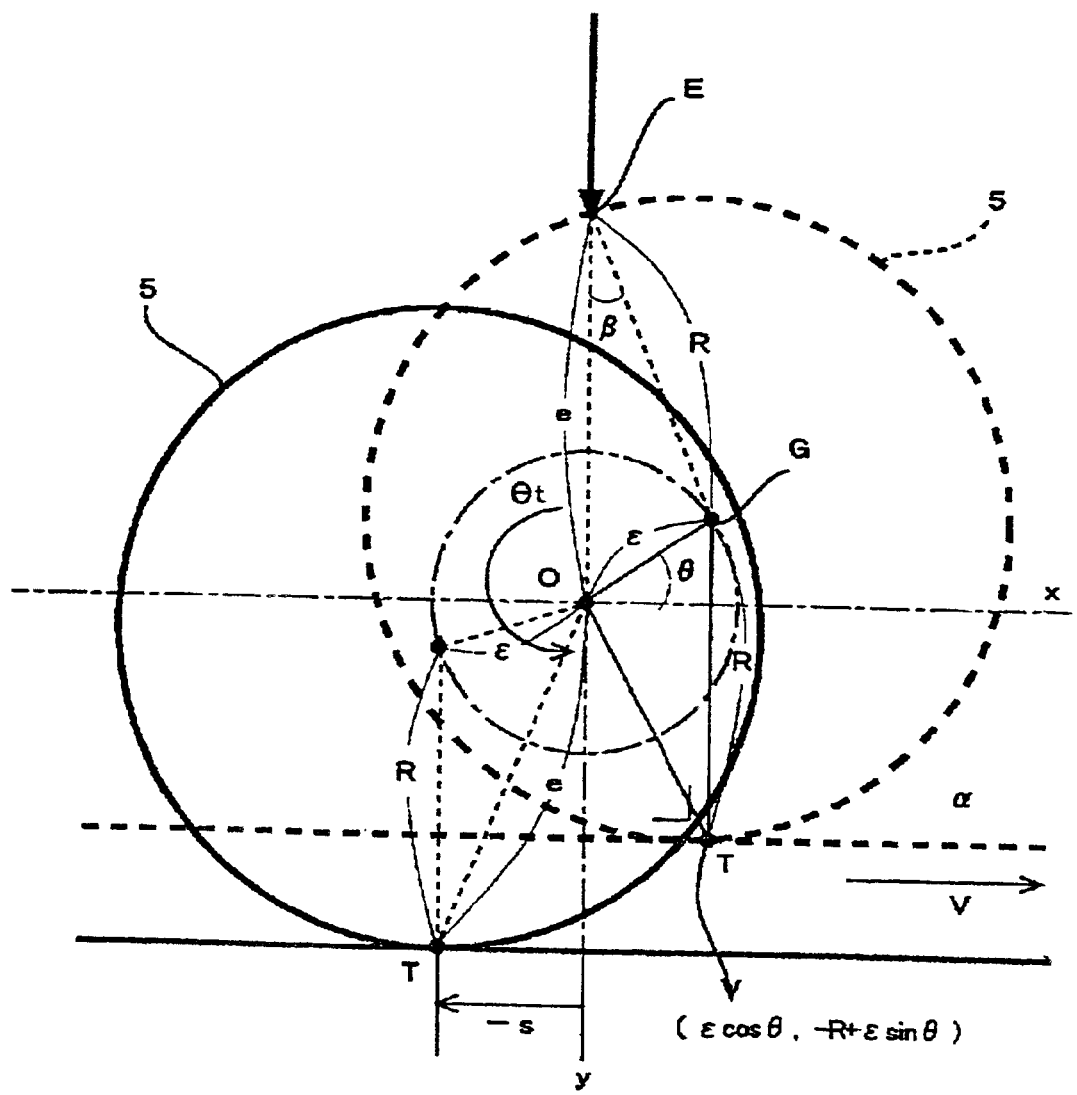
FIG. 5 shows a rotation angle from an exposure position to an image transfer position to occur when the drum has eccentricity and an irregular radius.

As shown in FIG. 5, an image transfer position is determined by a triangle OGE, which is indicated by a dotted line and determined at the moment of exposure. The triangle OGE will be referred to as an image transfer triangle relating to image transfer. More specifically, assume that the drum 5 indicated by a dotted line is exposed at a position E when the center of gravity G is located at an angle θ (angle GOx). The center of gravity G refers to the center of the drum 5 in the cross-section. When the drum 5 is rotated by an angle of Θt, an image formed on the drum 5 at the position E is transferred to a sheet at a position (x=−s)T remote from the ideal image transfer position (x=0).

The rotation angle Θ of the drum 5 between the exposure position and the image transfer position is expressed as:

$$\Theta t = \pi - \beta \qquad \text{Eq. (8)}$$

where β denotes an angle GEO.

Further, there hold the following equations:

$$\sin\beta = (\varepsilon/R)\cos \qquad \text{Eq. (9)}$$

$$\Theta t = \pi - \sin^{-1}\{(\varepsilon/R)\cos\theta\} \qquad \text{Eq. (10)}$$

Therefore, s representative of the image transfer position is produced by:

$$s = \varepsilon\cos(\theta - \beta) \qquad \text{Eq. (11)}$$
$$= \varepsilon\cos(\varepsilon/R)\left[\{(R/\varepsilon)^2 - \cos^2\theta\}^{1/2} + \sin\theta\right]$$

The above result teaches the following. Assume that the point of contact T between the drum 5 and the belt 1 moves integrally without any slip and has the maximum value (peak) at the belt side in the cross-section. Then, if the angle of eccentricity θ and the amount of eccentricity ε are known, the angle of rotation can be determined by the Eq. (10) and allows data for correcting image distortion and misregister to be generated.

(3) Generation of Image Data

A correcting method to be described adjusts the timing for generating an image in the main scanning direction such that image data is accurately transferred to an ideal position on the belt 1 at all times. So long as the drum 5 has an ideal radius of $R_0$ free from eccentricity, an image is transferred after the belt 1 has moved by a distance of $\pi R_0$ from the exposure position. However, if the drum 5 is eccentric and does not have the ideal radius $R_0$, an image transferred after the drum 1 has rotated by the angle Θt. Such an image transfer position is deviated from the ideal image transfer position by −s. The belt 1 conveys the transferred image at the speed V. More specifically, the data formed on the drum 5 by exposure is transferred to the position remote from the ideal position T by −s in a period of time of Θt/ω=τ, i.e., after the belt 1 has moved by a distance of Vτ from the exposure position.

Assume that the angular velocity of the drum 5 is $\omega_0$ when the drum 5 has the ideal radius $R_0$. Then, there holds an equation:

$$V = R_0\omega_0 \qquad \text{Eq. (12)}$$

It follows that image transfer is expected to occur in a period of time of $\pi/\omega_0\tau_0$ if the drum 5 has an ideal configuration.

The image expected to be positioned on the belt 1 at a distance of $x=V\tau_0$ from the exposure position is positioned at a distance of $x=V\tau$. Stated another way, an ideal image is achievable if image data corresponding to $x=V\tau$ is generated at the exposure side. This concept is essential because reference data for image generation is generated on the basis of the ideal drum configuration. That is, data occurred $d=V(\tau_0-\tau)$ before should only be generated. More specifically, there hold the following equations:

$$V = R\omega = R_0\omega_0 \qquad \text{Eq. (13)}$$

$$\Theta t = \alpha - \sin^{-1}\{(\varepsilon/R)\cos\theta\} \qquad \text{Eq. (14)}$$

$$d = V(\pi/\omega_0 - \Theta t/\omega) \qquad \text{Eq. (15)}$$
$$= R[\pi/\omega_0 - \pi + \sin^{-1}\{(\varepsilon/R)\cos\theta\}]$$

$$d = \pi(R_0 - R) + R\sin^{-1}\{(\varepsilon/R)\cos\theta\} \qquad \text{Eq. (16)}$$

Therefore, the data should only be delayed (or advanced, depending on the angle θ) by d data in accordance with the Eq. (16).

When the drum 5 is free from eccentricity, data should only be shifted by $d=\pi(R_0-R)$. It will readily be seen that because the peripheral speed V of the drum 5 is constant in the above condition, the transferred image has a constant pitch in the subscanning direction, i.e., has no irregularity in density. As shown in FIG. 5, when the drum 5 is eccentric, the peripheral speed of the drum 5 at the image transfer position or contact position T is determined by a distance e from the center of rotation of the drum 5. Therefore, even if the peripheral speed of the drum 5 is not V, the belt 1 and drum 5 constantly cooperate without any slip at the image transfer position, so that the belt 1 also moves at the speed V. More specifically, the image transfer position T where the drum 5 and belt 1 contact each other moves and therefore absorbs the difference in speed between the drum 5 and the belt 1.

Assume that the exposure position faces the belt 1. Then, an image formed at the distance e from the center of rotation O of the drum 5 is transferred at the position also spaced from the center of rotation O by e, so that the peripheral speeds at the exposure position and image transfer position are identical. That is, a latent image with line density provided at the exposure position is transferred at the image transfer position when the peripheral speed is the same. Because the image transfer position is moving, the line density of the latent image is identical with the line density of a latent image exposed when the peripheral speed is V, i.e., when the drum 5 is free from eccentricity. Stated another way, exposing the drum 5 at a position corresponding to the drum peripheral speed at the image transfer position is equivalent to exposing it in an eccentricity-free condition.

In the condition shown in FIG. 5, the peripheral speed at the exposure position E is high and makes the line density of the latent image low. The image with such low line density is transferred from the drum 5 to the belt 1 with higher line density because the belt 1 is scanned at a speed higher than the speed V of the belt B at the image transfer position T. It follows that even when the drum 5 is eccentric, the image is free from irregularity in density so long as the exposure position faces the belt 1.

(4) Detection of Eccentricity ϵ and Drum Radius R (4)-1 Self-Measurement

The radius R of the drum can be determined on the basis of a rotation angle of θi output from an encoder, which is directly connected to the drum 5, when the belt 1 is moved by a length $L=2\pi R_0$ corresponding to the circumferential length of an ideal drum. That is, the following relation holds:

$$R = L/\theta i \qquad \text{Eq. (17)}$$

If only the reference position for a rotation angle can be sensed due to the absence of an encoder, then a distance Lb that the belt 1 moves when the drum 5 completes one rotation may be determined to produce the radius R:

$$R = Lb/(2\pi) \qquad \text{Eq. (18)}$$

The eccentricity ϵ of the drum 5 can be determined if, e.g., the displacement of the circumference of the drum 5 ascribable to eccentricity is sensed. To sense the displacement, there may be used a light emitting device, a bisected photodiode or similar light sensing device, and optics. The light emitting device emits a light beam toward the sensing position of the circumference of the drum 5. The light receiving device receives the light beam reflected from the drum 5. The optics causes the light incident to the light receiving device to vary in accordance with the variation of the circumference of the drum 5 ascribable to eccentricity. For example, use may be made of focus error sensing type of optics generally applied to, e.g., an optical disk drive. More specifically, in FIG. 5, assume that the above arrangement is positioned at the positive side of the axis x. Then, when the drum 5 is rotated, the zero-crossing point and peak point of the variation of the resulting output signal are detected. Subsequently, the angle θ is determined on the basis of the amplitude of the peak point and the angle θ from the axis x, thereby producing the eccentric position (θ, ϵ) from the axis x.

The self-measurement scheme should only determine the eccentric position (θ, ϵ) with respect to the rotation range of the drum 5. Of course, information on the amplitude of eccentricity is also essential. More specifically, even when the rotation angle of the drum 5 is sensed by another means, there should only be determined where the eccentric position is located with respect to the rotation range of the drum 5 and how great the amplitude ϵ is.

(4)-2 Measurement at Factory

At a factory, there are measured the radius R and eccentricity ϵ of the drum 5 and information on the angle $\theta_0$ output from an encoder interlocked to the rotation of the drum 5 or based on a reference position (home position) output from a reference position sensor. Such information are written to a flash memory or similar memory included in the tandem image forming apparatus and are used later in order to determine the correction value d mentioned earlier. At the time of replacement, a serviceman or a user may input data provided on or attached to the drum 5 in the above memory.

(5) Operation Sequence

Figure 6:
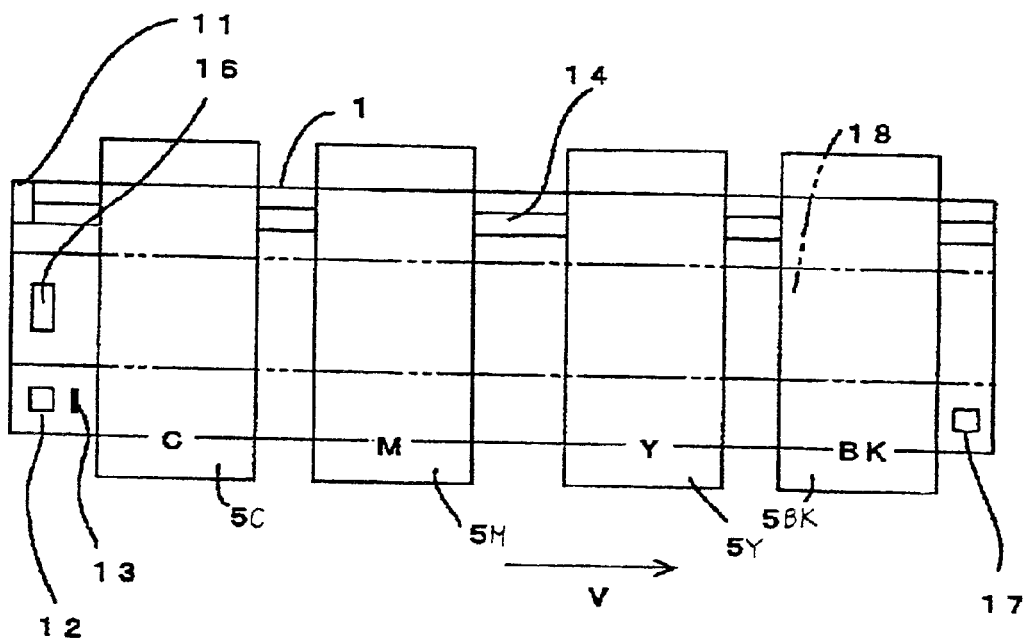
FIG. 6 is a plan view showing a specific configuration for describing control to be executed by a tandem image forming apparatus.

FIG. 6 shows a specific configuration of an image forming apparatus in a plan view. As shown, the drums 5C, 5M, 5Y and 5BK (collectively 5 hereinafter) are positioned on the endless belt 1 in the same manner as in FIG. 1. Arranged around each drum 5 are a sensor, not shown, responsive to the reference angular position of the drum 5 and a sensor, not shown, responsive to the planar displacement, or eccentric position, of the drum 5.

On the power-up of the apparatus, the belt 1 is driven without any sheet being fed. Because the belt 1 and drums 5 move integrally with each other without slipping on each other, the drums 5 rotate. The sensor responsive to the reference position and assigned to each drum 5 senses one rotation of the drum 5. The number of pulses output from a linear encoder responsive to the movement of the belt 1 up to the time when the drum 5 completes one rotation is determined to thereby determine the diameter of the drum 5. If desired, the phase of pulse intervals may be determined for enhancing accuracy. Further, the output of the sensor responsive to the eccentric position is combined with the output of the sensor responsive to the reference position and that of the linear encoder in order to determine an eccentric position. A rotation angle can be calculated because the number of pulses output from the linear encoder and corresponding to one rotation of the drum 5 is known beforehand. The amplitude of eccentricity can be determined in terms of the AC amplitude of the waveform output from the eccentric position sensor.

The above-described procedure is executed with all of the drums 5. Subsequently, the correction value d of Eq. (16) is calculated with the individual drum 5 for one rotation (θ=0 through 2π). The calculated correction values are written to a memory included in a controller, not shown, in the form of a reference table.

Subsequently, a lead edge sensor 12 located at one end of the belt 1 senses a reference mark 13 provided on the belt 1. It is assumed that each drum 5 is located at the ideal position and has the ideal configuration. Data in the main scanning direction that will cause test marks to be transferred to the reference mark 13 one above the other are written to the drums 5.

Optics, not shown, for exposing the drums 5 includes a polygonal mirror, not shown. Assume that the phase of the main scanning timing of the polygonal mirror is not coincident with the phase of the subscanning timing, which is synchronous to the movement of the belt 1. Specifically, a timing for starting main scanning is determined on the basis of a pulse signal that a sensor 11 for a linear encoder outputs on sensing a timing mark 14 provided on the belt 1. The above timing, however, is not always coincident with the main scanning timing of the polygonal mirror. Therefore, if the polygonal mirror does not reach its main scanning timing when an ideal timing for recording the test marks is reached, then the test marks are recorded at the main scanning timing of a motor that drives the polygonal mirror.

Figure 7:
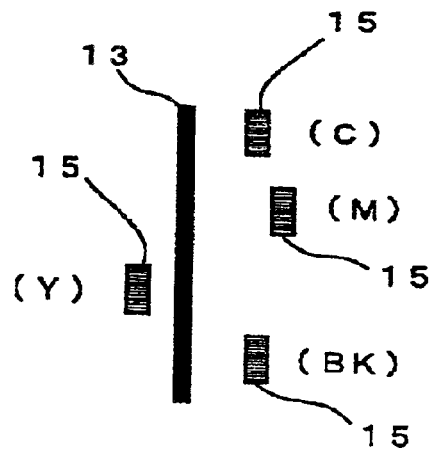
FIG. 7 shows a reference mark provided on the sheet conveying belt and test marks transferred to the belt.

As shown in FIG. 7, the deviation of each test mark 15 (Y, M, C or BK) transferred to the belt 1 from the reference mark 13 is determined. By correcting d (correction value) ascribable to the scatter of eccentricity ϵ and radius R and the above delay, it is possible to cancel the positional error of the drum 5. In this manner, the position of the drum 5 and the correction value d ascribable to the scatter of eccentricity E and radius R are obtained. If image data is generated by using the correction value d, then there can be formed an image free from misregister and distortion.

In FIG. 6, there are also shown a sensor 16 responsive to the leading edge of a sheet, a sensor 17 responsive to a reference position error, and a zone 18 where a sheet passes.

The prerequisite with the configuration described above is that the drums 5 and belt 1 move in synchronism with each other without any slip. So long as the point of contact between the belt 1 and each drum 5 has the maximum value (peak) at the belt side in the cross-section of the drum 5, the misregister and distortion of an image can be effectively corrected. However, the arrangement shown in FIG. 1 is apt to bring about a slip more than the arrangement shown in FIG. 4.

Figure 8:
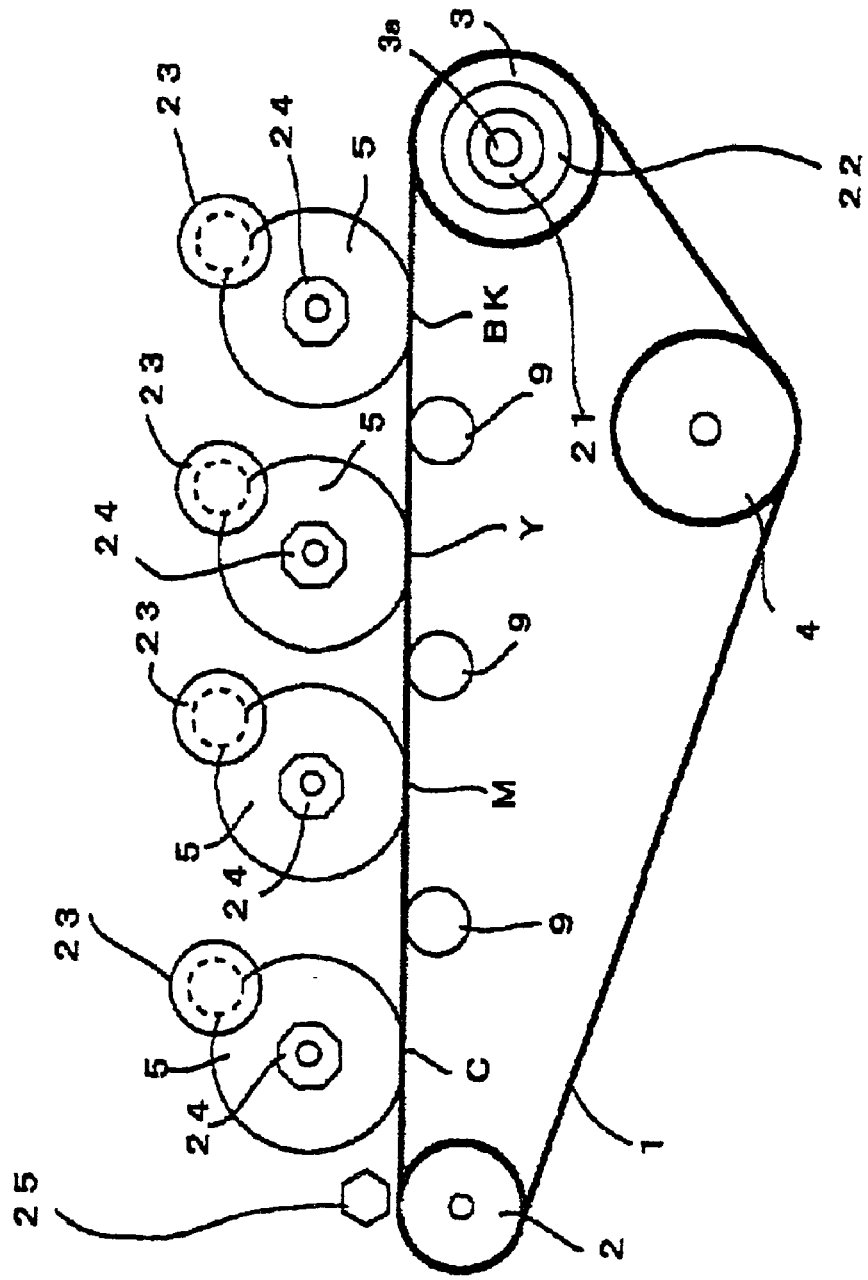
FIG. 8 is a view showing a the drums, a signal detecting system, and a drive system including a motor and rollers.

In light of the above, a drive source for correcting the variation of a load may be assigned to the individual drum 5. The drive source prevents the belt 1 and drum 5 from slipping on each other due to the variation of a load ascribable to, e.g., a cleaner adjoining the drum 5. This prevents the variation of a load from being imparted from one drum 5 to the other drums 5 via the belt 1. FIG. 8 shows another specific configuration based on such a concept. In FIG. 8, structural elements identical with the structural elements shown in FIGS. 1 and 6 are designated by identical reference numerals.

As shown in FIG. 8, an encoder 21 responsive to a rotation angle is directly connected to the shaft 3a of the drive roller 3 that drives the belt 1. The encoder 21 and a main motor 22, which drives the entire system, are used to control the speed of the entire system. In the following description, assume that the eccentricity of the drive roller 3 does not effect the variation of the belt speed. Correction motors 23 for correcting load variation each are assigned to one of the drums 5C, 5M, 5Y and 5BK (collectively 5 hereinafter). Each correction motor 23 transfers its output torque to the circmferential surface of the associated drum 5 outside of an image forming area via a small roller. A reference position sensor 24 is mounted on each drum 5 and outputs one pulse for one rotation of the drum 5, so that a reference position can be determined. A lead edge sensor 25 senses a reference mark, not shown, provided on the belt 1.

Figure 9:
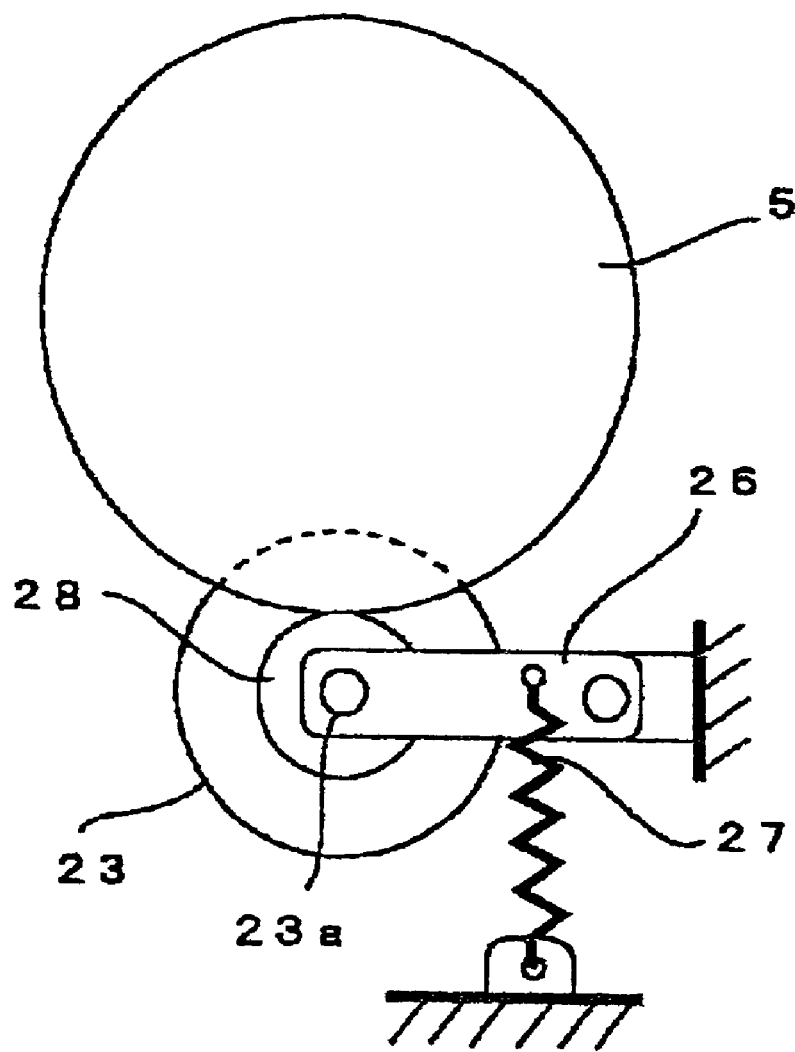
FIG. 9 is a view showing a mechanism included in the drive system of FIG. 8 for biasing a motor.

FIG. 9 shows an arrangement around each correction motor 23 specifically. As shown, the correction motor 23 has an output shaft 23a on which a roller 28 is mounted on a lever 26. A spring 27 through lever 26 constantly presses the roller 28 against the drum 5.

The outputs of the various sensors shown in FIG. 8 are used not only to execute the control stated earlier, but also to sense an error ascribable to a slip occurred between the belt 1 and any one of the drums 5. More specifically, whether or not an error has occurred is determined on the basis of whether or not the period of the output of the sensor 24 and the rotation angle of the encoder 21 have a preselected relation.

Control executed by the main motor 22 and encoder 21 will be described hereinafter with reference to FIG. 10. Assume that the target speed of the belt 1 is V, and that the drive roller 3 has a radius of Rr. Then, the rotation speed Gr of the main motor 22 is $\omega_r=V/Rr$. Further, assume that the encoder 21 outputs Nr pulses for one rotation of the main motor 22. Then, when the belt 1 is moving at the target speed V, pulses output from the encoder 21 have a frequency fr expressed as:

$$fr = Nr \cdot \omega_r / (2\pi) = Nr \cdot V / (2\pi Rr) \qquad \text{Eq. (19)}$$

Figure 10:
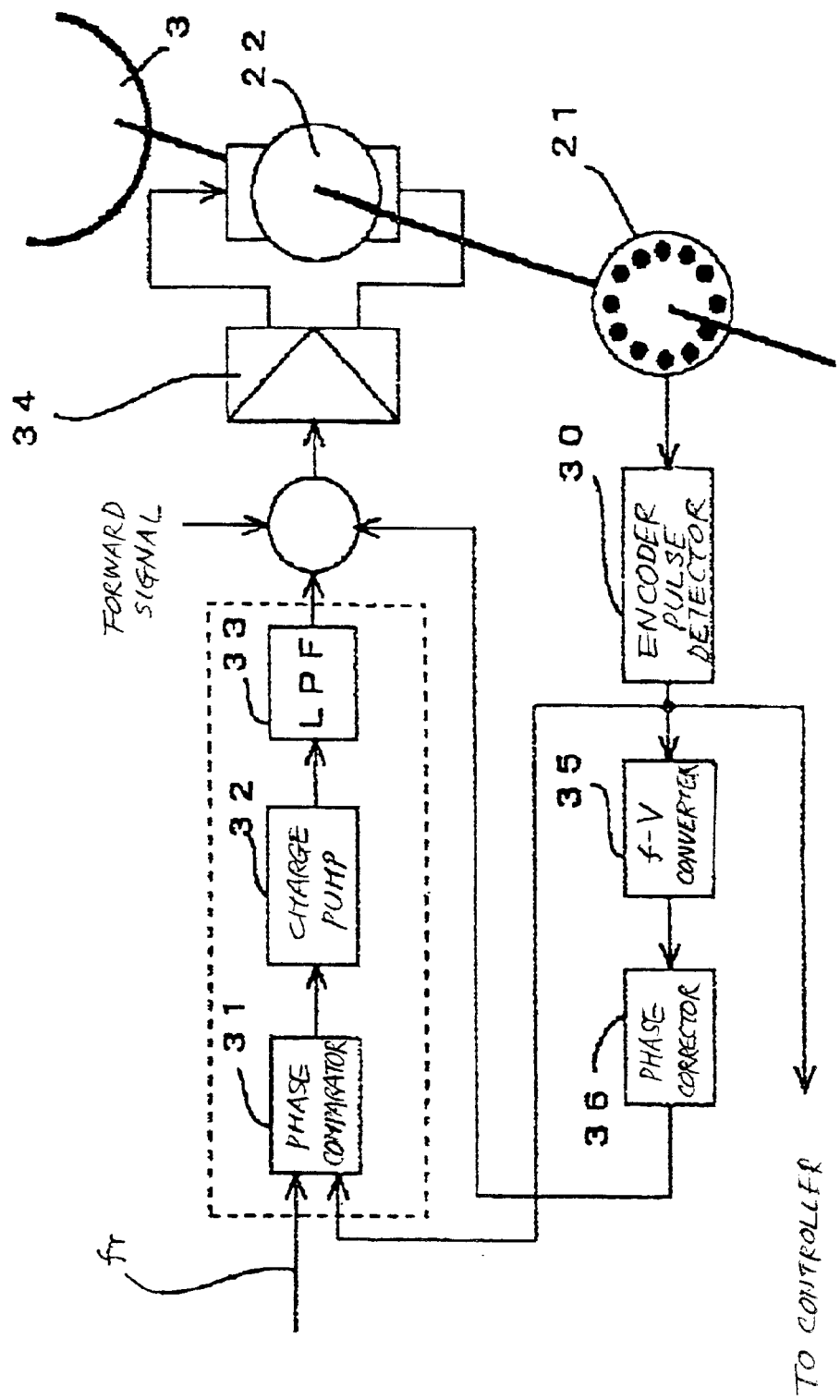
FIG. 10 is a block diagram schematically showing control circuitry for controlling a drive roller included in the drive system.

Pulses (clock) fr equal to the above frequency are input to a control circuit shown in FIG. 10 as reference pulses. A phase comparator 31 compares the pulse signal and the output of an encoder pulse detector 30. The output of the comparator 31 representative of a difference is routed through a charge pump 32 and an LPF (Low-Pass Filter) 33 to become an analog voltage signal. The analog voltage signal is input to a power amplifier 34. Such a procedure is identical with conventional motor control based on a PLL (Phase Locked Loop) scheme.

The output of the encoder pulse detector 30 is input to a frequency-to-voltage (f-V) converter 35 and converted to a voltage signal thereby. This voltage signal is proportional to angular velocity. The voltage signal is fed back to the input of the power amplifier 34 via a phase corrector 36 in order to improve the control characteristic of the control circuit. As for a feed forward signal, assume that the timing and amount of load variation around the belt 1 are accurately known beforehand. Then, feed forward control is executed with respect to the above timing and amount for thereby further enhancing accurate control.

Figure 11:
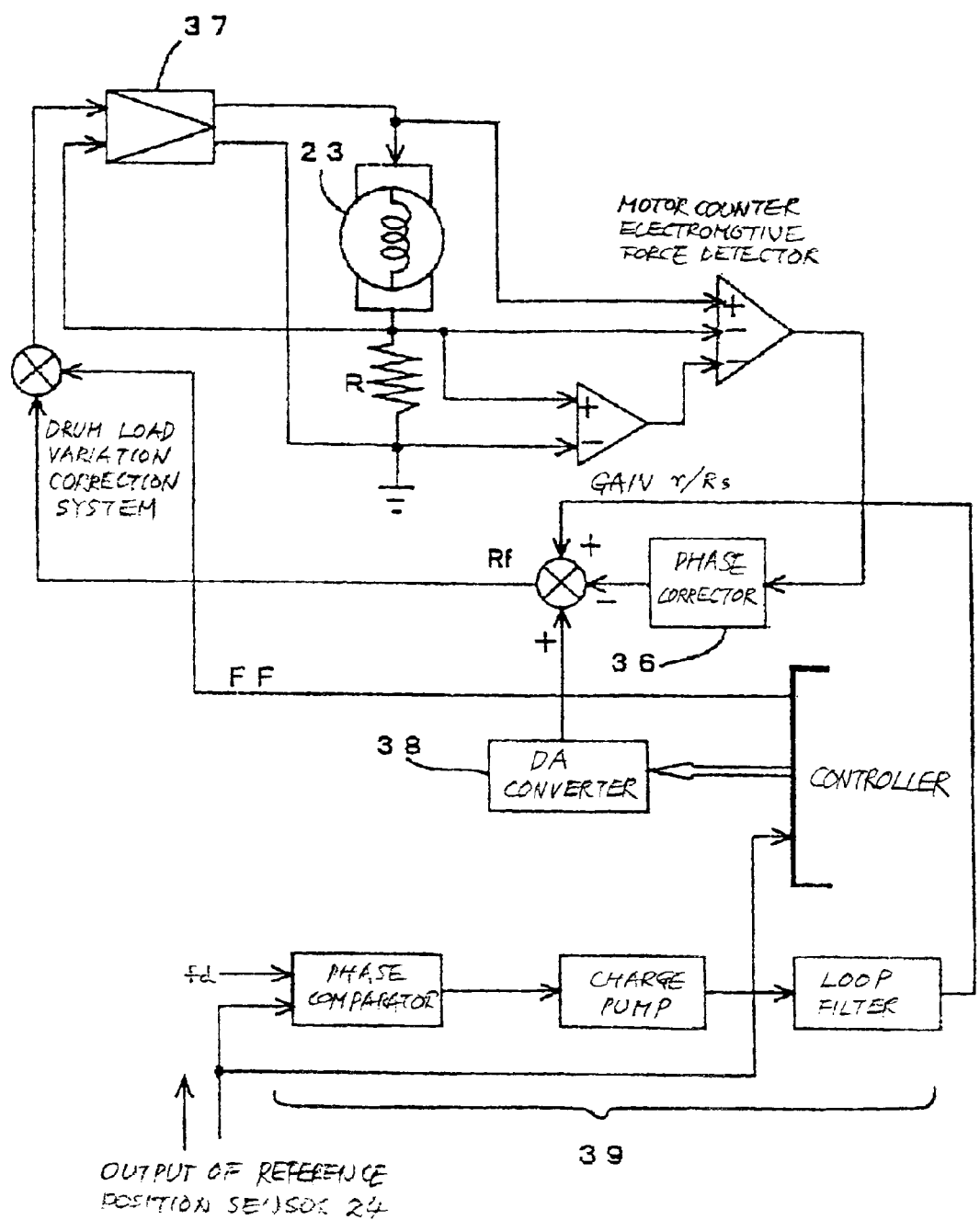
FIG. 11 is a schematic block diagram showing circuitry for controlling the rotation of the motor.

FIG. 11 shows specific circuitry for controlling the rotation of the individual correction motor 23. Basically, the circuitry is configured to cause the correction motor 23 to cope with the variation of a load with its torque, thereby minimizing the variation of a load to be transferred via the belt 1. Calculations relating to the control over the correction motor 23 will be described hereinafter.

The drum 5 rotates integrally with the belt 1 that is moving at the speed V, so that the drum 5 rotates at an angular velocity X equal to V/R. This means that a slip does not occur if the rotation speed of the drum 5 is controlled to $\omega=V/R$. Assuming that the drum 5 has an ideal radius of Ro, then the encoder 21 outputs No pulses when the drum 5 completes one rotation:

$$No = Ro \cdot Nr / Rr \qquad \text{Eq. (20)}$$

In the mechanical aspect, more accurate control can be easily executed if the apparatus is so designed as to make Ro/Rr a natural number. To measure the actual radius R of the drum 5, encoder pulses output up to the time when the drum 5 completes one rotation are counted. Assume that the number of pulses counted is N, and that a phase representative of an interval between the pulses is $2\pi P$ (0<P<1). Then, N+P pulses are output up to the time when the drum 5 completes one rotation. In this case, the radius R of the drum 5 is expressed as R=Rr(N+P)/Nr. It follows that the belt 1 moving at the speed V and the drum 5 can move integrally with each other if the drum 5 rotates at the angular velocity $\omega=V/R=V\cdot Nr/\{Rr(N+P)\}$. When the drum 5 has the ideal configuration, it rotates at an angular velocity of $\omega=V/Ro$. Therefore, there holds:

$$\omega = \{No(N + P)\}\omega_0 \qquad \text{Eq. (21)}$$

In the above condition, pulses output from the reference position sensor 24 have a frequency of fd:

$$fd = \omega / (2\pi) \qquad \text{Eq. (22)}$$

Also, when the drum 5 has the ideal configuration, pulses output from the reference position sensor 24 have a frequency of fdo:

$$fdo = \omega 0 / (2\pi) \qquad \text{Eq. (23)}$$

The frequencies fr and fdo have the following relation:

$$fr = Nr \cdot V / (2\pi Rr) = Nr \cdot Ro / Rr) fdo \qquad \text{Eq. (24-1)}$$

$$fdo = \{Rr / (Nr \cdot Ro)\} fr \qquad \text{Eq. (24-2)}$$

The relations described above are used to arrange the PLL control circuitry.

Figure 12:
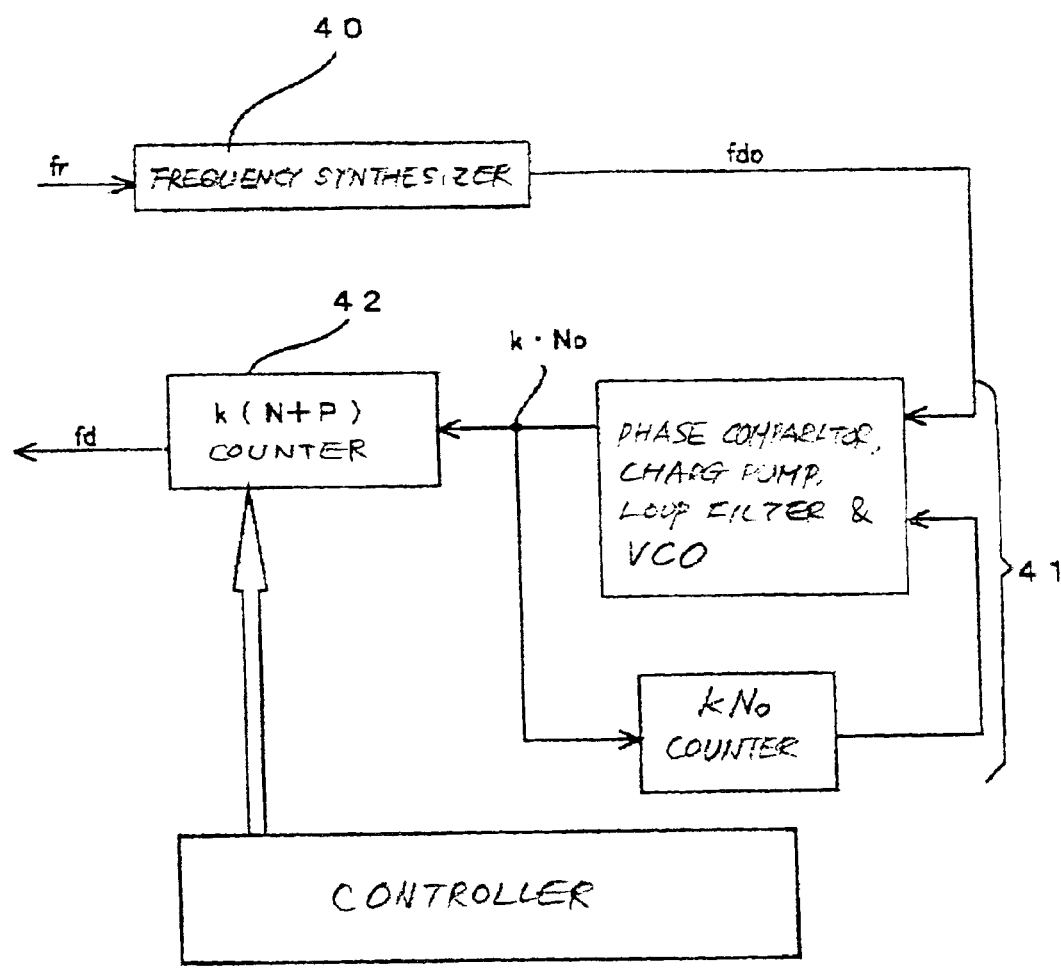
FIG. 12 is a schematic block diagram showing a circuit for determining the clock frequency of a reference input applied to the circuitry of FIG. 8.

FIG. 12 shows a circuit for determining the frequency fd of the reference input or clock of the circuitry for correcting the variation of a load. As shown, a frequency synthesizer 40 synthesizes the frequency fdo on the basis of the reference pulse frequency fr, which is compared with the encoder output pulses. This frequency fr is output by an oscillator, not shown, that oscillates a frequency determined by the Eq. (19). In FIG. 12, k is a natural number selected in matching relation to the accuracy of phase information detection available with the encoder. For example, when the encoder has a phase detection resolution of $0.2 \times 2\pi$, any desired number that is "5" or above may be selected for k. A PLL circuit 41 is made up of a phase detector, a charge pump, a loop filter, a VOC (Voltage Controlled Oscillator) and a k·No counter. The PLL circuit 41 multiplies the frequency fdo to produce k·No·fdo. A k(N+P) counter 42, which can set a count therein, performs division in order to produce the frequency fd. The count of the k(N+P) counter 42 is determined by the measured values stated earlier. Of course, kP is a natural number rounded off. The circuit shown in FIG. 12 is assigned to each of the four drums 5. However, the drum-by-drum circuits share the part between the input fr and the output k·No for simple circuit configuration.

The circuit shown in FIG. 11 includes a pLL circuit 39 to which the reference input fd output by the circuit of FIG. 12 is input. The circuit of FIG. 11 is also assigned to each of the drums S. The reference input fd and the output of the reference position sensor 24 are compared in phase so as to cause the drum 5 to rotate at a constant speed. The drum 5 can therefore rotate at an adequate speed in accordance with the scatter of its radius without any slip.

Assume that timing and amount of variation of a load around the drum 5 or the belt 1 are known beforehand. Then, for more accurate control, a controller shown in FIG. 11 outputs a feed forward signal FF for executing feed forward control drum by drum.

Further, for more stable control, a speed feedback system is added that receives a signal proportional to the rotation speed of the drum 5 and output from the correction motor 23. More specifically, because the PLL circuit uses the pulses each corresponding to one rotation of the drum 5, the speed feedback system corrects variation that may occur between the pulses.

The controller feeds reference speed data represented by the Eq. (21) to a DA (Digital-to-Analog) converter 38. The resulting output of the DA converter 38 is compared with a counter electromotive force generated in proportion to the speed of the correction motor 23. The counter electromotive force is produced by subtracting the internal resistance r of the correction motor 23 from the voltage on the motor terminal. A power amplifier 37 is used as a current source in order to improve the characteristic of the control system. A phase corrector 36 also serves to improve the characteristic of the control system. As stated above, the entire system is controlled by the main motor 22 while the variation of a load is corrected by the individual correction motor 23.

Consideration should be also given to the fact that a slip is apt to occur when friction acting between the drum 5 and the belt 1, between the drum 5 and a sheet or between a sheet and the belt 1 is low. It is therefore necessary to further reduce the variation of a load ascribable to the error of the control system assigned to the individual correction motor 23 and imparted to the entire drive control.

As stated above, the errors of the motor-by-motor control systems effect the belt driveline as a load. It is therefore necessary to monitor the current waveform of the main motor 22, determine whether the correction of the individual correction motor 23 is excessive, short or adequate, and then correct the reference clock or the reference signal amplitude input to the motor-by-motor control systems. I am now studying such a control procedure as well although not shown or described specifically.

A preferred embodiment of the present invention will be described hereinafter.

In a tandem color printer or color copier with resolution as high as 2,400 dpi or 1,200 dpi, the scatter of the eccentricity and radius of the individual photoconductive rum is not negligible. Considering the scatter of line density and register as well, it is necessary to constantly hold the peak of the cross-section of each drum in contact with an endless belt. That is, control that causes the belt to drive the drum while satisfying the above condition is essential. To implement such control stably, it is most desirable to cause the belt to move at a constant speed.

More specifically, if the belt is controlled to move at a constant speed, then the individual drum should only be controlled to rotate at a constant angular velocity even if it is eccentric. Control of the drum to a constant angular velocity is easy to execute. If the sheet conveying belt or an intermediate image transfer belt is controlled to move at a constant speed, then even the conventional arrangement described previously can meet the demand for high image quality and therefore accurate drive.

The illustrative embodiment pertains to conditions that can move the endless belt at a constant speed via a drive roller by using only an encoder, which is responsive to a rotation angle. Specifically, when a motor for driving the belt is rotated at a constant angular velocity, any eccentricity of the drive roller causes the speed of the belt to vary. However, the belt speed does not vary if the belt always contacts the peak of the cross-section of the drive roller, i.e., if the belt always contacts the drive roller perpendicularly to a line that passes through the center of the cross-section of the drive roller in a preselected direction. The above line is assumed to move only in parallel.

(1) Belt Speed and Drive Roller Angular Velocity (I)

Figure 13:
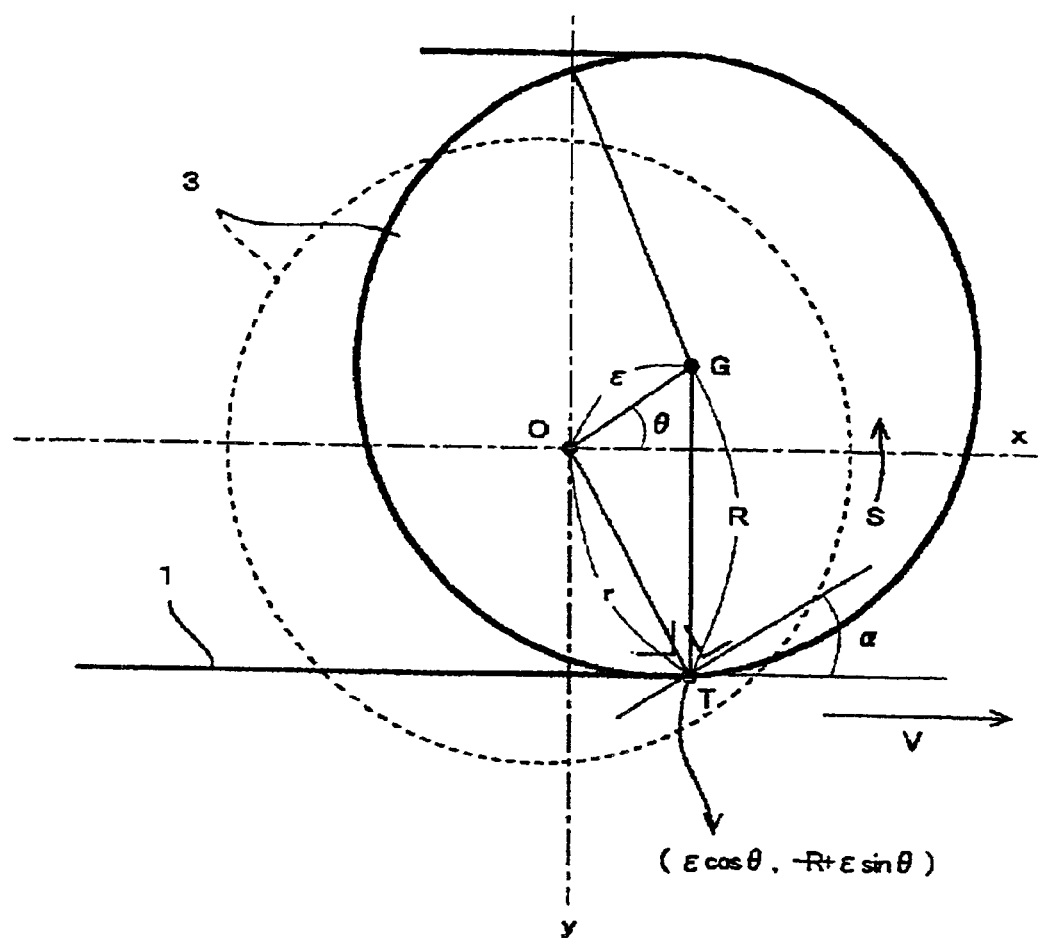
FIG. 13 shows a relation between a belt and a drive roller unique to an embodiment of the present invention.

Assume that the belt 1 constantly contacts the peak of the cross-section of the drive roller 3. As shown in FIG. 13, assume that the drive roller 3 has eccentricity of $\epsilon$, and that the angle of the eccentric position G from the axis x is $\theta$. Then, the point of contact T between the belt 1 and the drive roller 3 is expressed in terms of coordinates as:

$$(-\epsilon\sin\theta \cdot \omega, \epsilon\cos\theta \cdot \omega), \omega = d\theta/dt \qquad \text{Eq. (25)}$$

Therefore, a speed Vs in a direction S in which the drive roller 3 rotates about its center O is produced by:

$$Vs = V\cos\alpha - \epsilon\sin\theta \cdot \omega \cdot \cos\alpha + \epsilon\cos\theta \cdot \omega \cdot \sin\alpha \qquad \text{Eq. (26)}$$

where V denotes the moving speed of the belt 1, and $\alpha$ denotes an angle between the belt 1 and a line perpendicular to a line r that connects the center O of the drive roller 3 and the point of contact T.

Therefore, there holds an equation:

$$\omega = Vs/r = (V\cos\alpha - \epsilon\sin\theta \cdot \omega \cdot \cos\alpha + \epsilon\cos\theta \cdot \omega \cdot \sin\alpha)/r \qquad \text{Eq. (27)}$$

The cosine formula derives:

$$r^2 = R^2 + \varepsilon^2 - 2R\varepsilon\cos(\pi/2 - \theta) = R^2 + \varepsilon^2 - 2R\varepsilon\sin\theta \quad \text{Eq. (28)}$$

where R denotes the radius of the drive roller.
The cosine formula derives:

$$\varepsilon/\sin\alpha = r/\sin(\pi/2 - \theta) = r/\cos\theta \quad \text{Eq. (29)}$$

$$\sin\alpha = \varepsilon\cos\theta/r, \cos\alpha = (R - \varepsilon\sin\theta)/r \quad \text{Eq. (30)}$$

By substituting the Eqs. 28, 29 and 30 for the Eq. (27), there is produced:

$$\omega = \{VR - (V + \omega R)\varepsilon\sin\theta + \omega\varepsilon^2\}/(R^2 + \varepsilon^2 - 2R\varepsilon\sin\theta) \quad \text{Eq. (31)}$$

$$\omega(R^2 + \varepsilon^2 - 2R\varepsilon\sin\theta) =$$

$$VR - (V + \omega R)\varepsilon\sin\theta + \omega\varepsilon^2(\varepsilon\sin\theta - R)(V - R\omega) = 0$$

$$\varepsilon\sin\theta - R \neq 0$$

Therefore, V=Rω holds.

It will therefore be seen that if the angular velocity of the drive roller is constant and if the belt 1 is free from a slip, then the belt speed V remains constant despite eccentricity. However, the prerequisite is that the belt 1 remains horizontal. Generally, as far as the relation between the drum 5 and the belt 1 shown in FIG. 1 is concerned, a condition close to the above condition is easy to implement because the belt 1 extends at both sides of the point of contact T. However, when it comes to the drive roller 3, some measure to be described hereinafter is necessary because the belt 1 extends only at one side.

A first specific measure positions a roller adjoining the drive roller and drum and contacting the belt and provides the roller with the same diameter as the drive roller to thereby match the phases of eccentricity. This reduces the variation of belt speed when the drive roller is controlled to the preselected angular velocity. The variation of belt speed becomes zero if the amounts of eccentricity are identical. However, any small difference in radius between the roller and the drive roller disturbs the phase as the time elapses. To solve this problem, the roller adjoining the drive roller may be connected to, e.g., a gear.

A second specific measure determines the angle and size of eccentricity of the drive roller and causes the roller adjoining the drum to move up and down perpendicularly to the belt. In this case, it is necessary to reduce the eccentricity of the above roller as far as possible.

When neither the first specific measure nor the second specific measure is desired, use may be made of the following fourth third measure. The third specific measure uses a drive roller and a roller machined, as to eccentricity, accurate enough to control the variation of the belt speed to or below the target value. The roller adjoining the drive roller may be implemented as two rollers sandwiching the belt.

A fourth specific measure uses a drive roller machined, as to accuracy, and mounted accurate enough to control the variation of the belt speed to or below the target value. In this case, a support guide body is fixed in place in place of the roller adjoining the drum.

(2) Belt Speed and Angular Velocity of Drive Roller (II)

Figure 14:
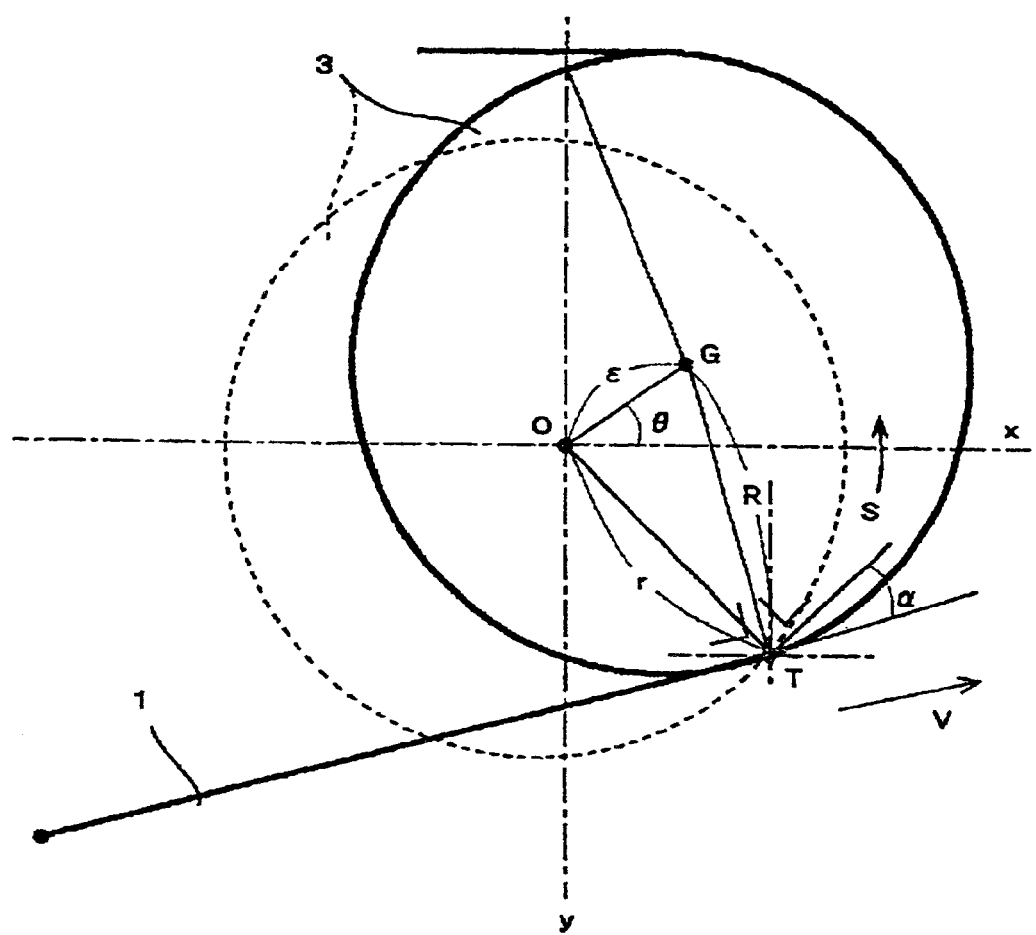
FIG. 14 shows a relation between the belt and the drive roller contrastive to the relation of FIG. 13.

Assume that the belt 1 does not constantly contact the peak of the cross-section of the drive roller 3. Then, as shown in FIG. 14, the point of contact T between the belt 1 and the drive roller 3 varies due to the eccentricity ε in the same manner as in FIG. 13. In this case, the previously stated condition is not satisfied, so that the belt speed varies even if the angular velocity of the drive roller 3 is constant.

Figure 19:
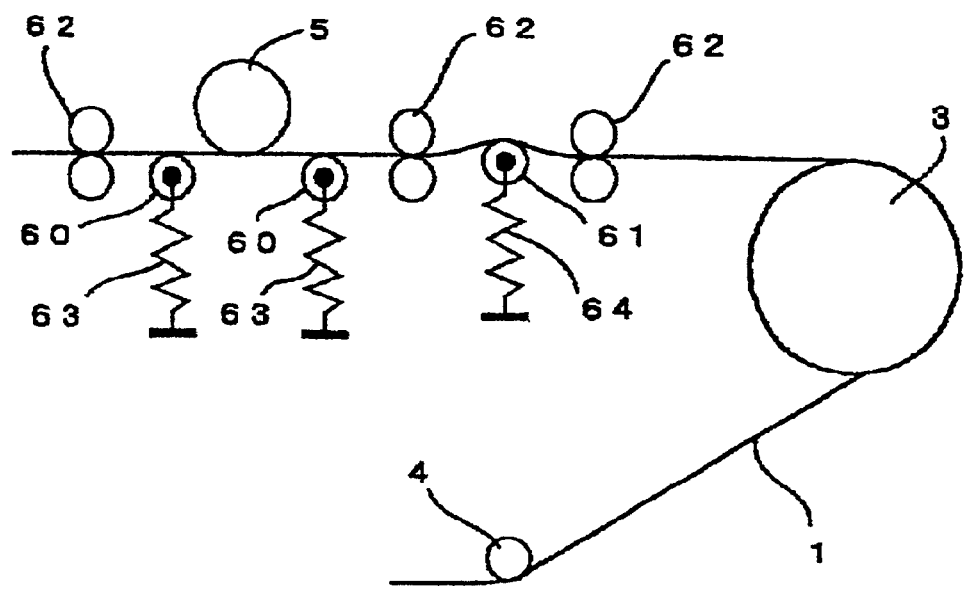
FIG. 19 is a view showing a relation between the drum, the roller, the drive roller and the belt particular to the illustrative embodiment.

(3) Assembly and Machining of Drive Roller and Roller Adjoining Drum Capable of Reducing Eccentricity to Zero To implement the simplest mechanism, assume the assembly and machining of the drive roller and the roller adjoining the drive roller at the drum side with respect to the belt, as stated in relation to the specific measures. Because the drive roller and roller adjoining it are not expected to be dismounted by the user, they may be configured to accommodate an adjusting mechanism. If the adjusting mechanism realizes accuracy above the target specification, then a rotation angle encoder suffices for accurately controlling the belt to a constant speed. Specific methods to be described are not applicable to the drum, which is sometimes removed for a replacement or similar purpose. As shown in FIG. 19, the roller adjoining the drive roller 3 may be implemented as two rollers 62 sandwiching the belt 1.

Figure 15:
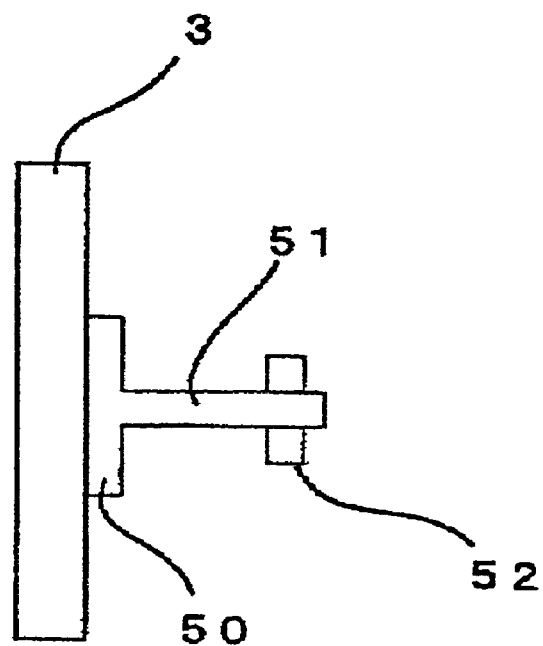
FIG. 15 is a view showing a specific configuration of the drive roller and an auxiliary roller included in the illustrative embodiment.

A first specific method consists in machining the drive roller and adjoining roller with high accuracy and then mounting and adjusting them. Specifically, as shown in FIG. 15, the drive roller and adjoining roller machined with accurate circularity and radius each are bidimensionally adjustable in position. After the adjustment of eccentricity, dynamic balance is set up. More specifically, an auxiliary roller 50 is pressed against one end of the drive roller 3. A bearing 52 rotatably supports a shaft 51 that is connected to the auxiliary roller 50 and driven by a motor, not shown. In this condition, the motor causes the drive roller 3 to rotate via the auxiliary roller 50. The end of the auxiliary roller 50 contacting the end of the drive roller 3 is bidimensionally movable relative to the latter.

The dynamic balance of the drive roller 3 should preferably be set up after the mounting of the motor. Alternatively, dynamic balance may be set up before the mounting of the motor if the rotation speed is low. Dynamic balance may even be omitted if the rotation speed is even lower than the above rotation speed. However, the adjustment of dynamic balance is essential when power consumption must be reduced.

Figure 16:
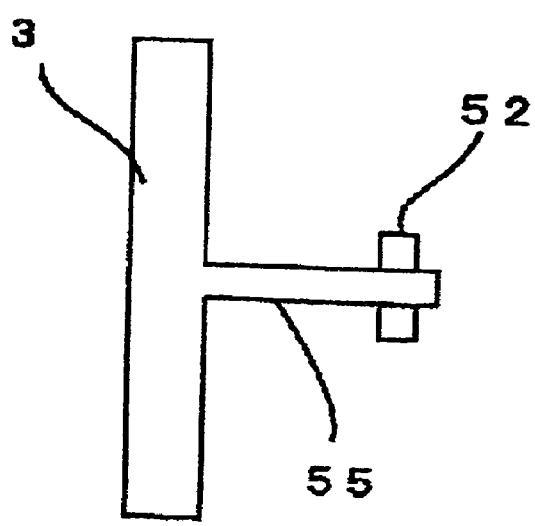
FIG. 16 is a view showing another specific configuration of the drive roller and auxiliary roller.

A second specific method consists in implementing the drive roller or the adjoining roller as a single molding. Specifically, as shown in FIG. 16, the drive roller 3 and a shaft 55 are molded integrally with each other. The shaft 55 is rotatably supported by a bearing 52 and driven by a motor not shown. This configuration reduces the eccentricity of the drive roller 3. The adjoining roller may be configured in the same manner as the drive roller 3.

The shaft 51 shown in FIG. 15 or the shaft 55 shown in FIG. 16 may be directly connected to the rotor of the motor. When the motor is driven via gears or a belt, a gear or a pulley is mounted on the shaft 51 or 55.

(4) Eccentricity of Rotation Angle Encoder

Assume that a disk included in a rotation angle encoder and provided with timing mark is eccentric. Then, the drive roller cannot be controlled to a constant speed even if the timing marks are sensed. In such a case, a plurality of timing mark sensors are arranged at equal angular intervals with respect to the shaft of the disk. The outputs of all of the timing mark sensors responsive to the timing marks are fed back for obviating the influence of the eccentricity of the encoder. For example, two timing sensors may be positioned to face the shaft of the disk.

(5) Control Using Timing Marks Provided on Belt

The belt can be controlled to a constant speed if the motor is controlled in accordance with the movement of the belt finally sensed. However, if the eccentricity of the drive roller is noticeable, then the control system must be provided with a gain high enough to correct the eccentricity. As a result, the control frequency band is broadened and requires high mechanical rigidity. In this sense, the eccentricity of the drive roller and adjoining roller must be as small as possible.

(6) Stabilization of Belt Movement against Drum Eccentricity in Tandem Image Forming Apparatus In the tandem image forming apparatus, the drum causes the surfaces of the drum and belt contacting each other to move up and down if eccentric. As a result, the distance between nearby drums becomes apparently irregular, causing the belt to repeatedly tighten and slacken. Therefore, to guarantee high image quality, it is necessary to maintain the belt in contact with the peak of the cross-section of the drum as far as possible for thereby correcting the variation of the distance between nearby drums.

Figure 17:
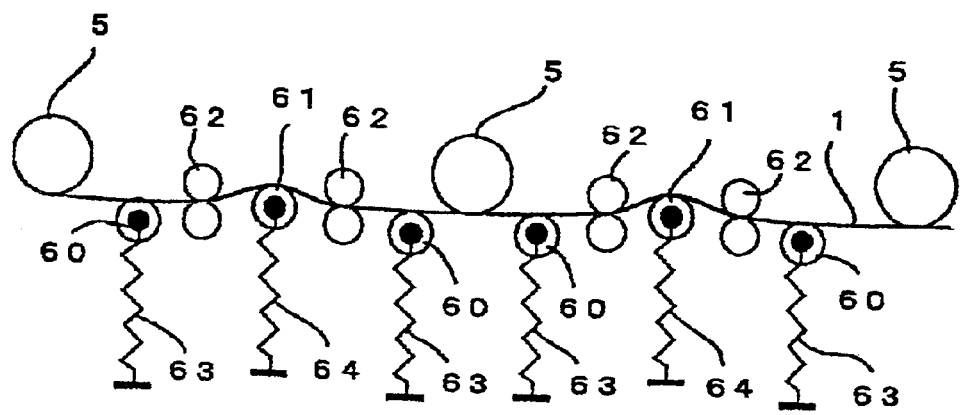
FIG. 17 is a view showing a specific relation between photoconductive drums, a roller and the belt included in the illustrative embodiment.

Specifically, as shown in FIG. 17, rollers 60 press the belt 1 against the drums 5. Tension rollers 61 adjust the tension of the belt 1 that moves up and down due to the eccentricity of the drums 5. Further, roller pairs 62 maintain the belt 1 at a preselected running position, and each has a fixed shaft. Springs 64 each constantly bias associated one of the tension rollers 61. With this configuration, it is possible to maintain the slackening or the tightening of the belt 1 constant for thereby holding the belt 1 in contact with the peak of the cross-section of the drum 5. The rollers 60 biased by the springs 63 are positioned at both sides of the image transfer position assigned to each drum 5, helping the tension rollers 61 achieve the above purpose.

Figure 18:
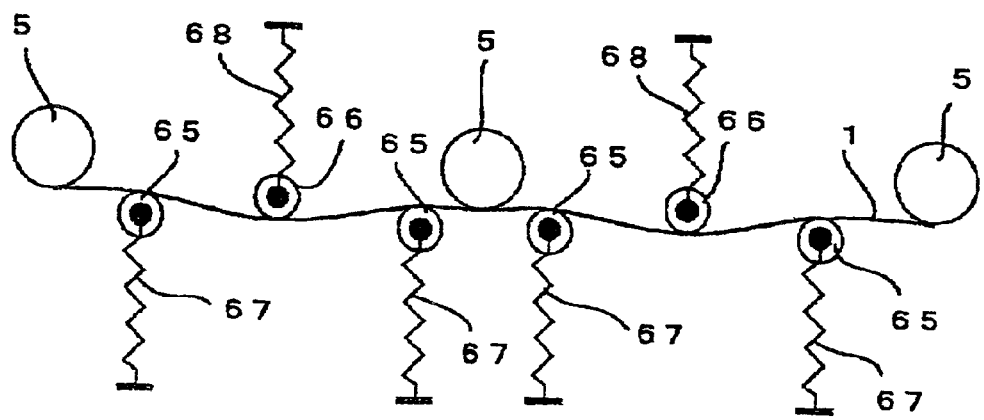
FIG. 18 is a view similar to FIG. 17, showing another specific relation between the same.

FIG. 18 shows another specific configuration in which the fixed roller pairs 62 are omitted. This can be done if a relation between biasing forces is accurately selected. As shown, rollers 65 press the belt 1 against the drums 5 while tension rollers 66 adjust the tension of the belt 1. The rollers 65 and tension rollers 66 are constantly biased by springs 67 and 68, respectively. If desired, the rollers 65 located at both sides of the image transfer position assigned to each drum 5 may be replaced with fixed rollers that do not rotate. This kind of configuration is usable if target image quality can be achieved although the condition of contact of the belt 1 with the cross-section of the drum 5 may be slightly degraded.

More specifically, mechanisms of biasing the rollers 60 or 65 and tension rollers 61 or 66 are arranged at one or both edges of the belt 1 in the direction perpendicular to the direction in which the belt 1 runs. The rollers 60 or 65 and tension rollers 61 or 66 or the drive roller 3 has a length equal to or greater than the width of the belt 1. If desired, the rollers 60, 65, 61 and 66 may be distributed to the opposite edges of the belt 1.

FIG. 19 shows a configuration in which the drive roller 3 has eccentricity and radius accurately confined in target ranges. This is also true with the roller pair 62 closest to the drive roller 3. When the drive roller 3 is controlled to a constant speed in the above condition, the belt 1 can stably move at a constant speed even if the drums 5 are eccentric. This is also true with a driven roller, not shown, remote from the drive roller 3. The driven roller does not have to be as accurate as the drive roller 3 as to eccentricity and radius although higher accuracy reduces the variation of a load. In FIGS. 17 through 19, the rollers 60, 65, 61 and 66 biased by springs each may be provided with an elastic surface that contacts the belt 1.

(7) Accurate Mechanism for Driving Drive Roller

It has been customary to use a gear train, belt or similar speed reduction mechanism connected to a motor and to mount a large flywheel on a drive roller or on the shaft of a photoconductive drum, as taught in Laid-Open Publication No. 10-63059 discussed earlier. This configuration reduces oscillation ascribable to the transmission mechanism and increases motor efficiency. However, the transmission mechanism introduced in the driveline involves the deterioration of rigidity and eccentricity, making accurate control for constant rotation difficult.

Today, a motor including a core implemented by coils wound round the slot yoke of a stator is extensively used as a drive motor. This kind of motor, however, cannot avoid cogging. Laid-Open Publication No. 6-271130 also mentioned earlier teaches a specific configuration using a pulse motor, but this motor cogs, too. Therefore, any one of such motors is directly connected to the drive roller, the variation of speed directly appears. Ideally, use should be made of a coreless brushless motor that is free from cogging. A direct drive system, as distinguished from the drive system using the transmission mechanism, lowers motor efficiency. However, the direct drive system allows each motor assigned to a particular drum to absorb various kinds of load fluctuation acting on the drum. This reduces the power consumption of a belt drive system included in a tandem color printer or color copier. It follows that the direct drive system promotes accurate control over drive and makes the drive mechanism small size and simple.

The motor, drive roller and encoder share bearings. An outer rotor motor increases inertia and is therefore expected to implement the conventional flywheel effect. Further, an outer rotor motor has the following advantages.

Figure 20:
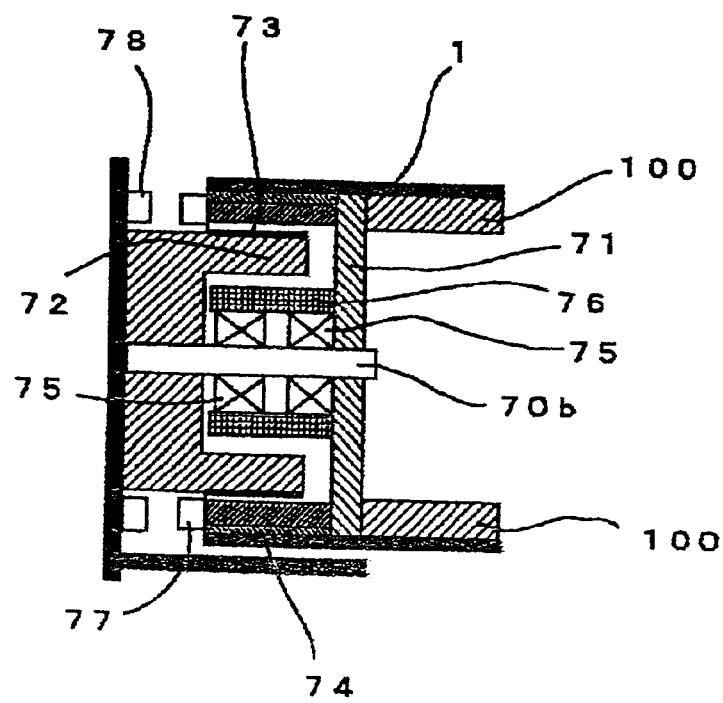
FIG. 20 is a section showing a relation between an outer rotor coreless motor and the belt particular to the illustrative embodiment.

FIG. 20 shows a specific configuration of the outer rotor motor. As shown, the outer circumference of the motor serves as the drive roller for driving the belt 1. An encoder is mounted on the rotor. Specifically, the motor includes a stationary shaft 70b, an outer roller 71 over which the belt 1 is passed, a stator 72, a coil 73, a permanent magnet and yoke 74, bearings 75 rotatable about the shaft 70b, a bearing holder 76, an encoder disk 77 provided with timing marks, a reflection type sensor 78 for the encoder, and a roller 100 concentric with the outer roller 71 and identical in radius with the outer roller 71. The roller 100 supports the belt 1 and transfers a driving force to the belt 1 by friction.

Figure 21:
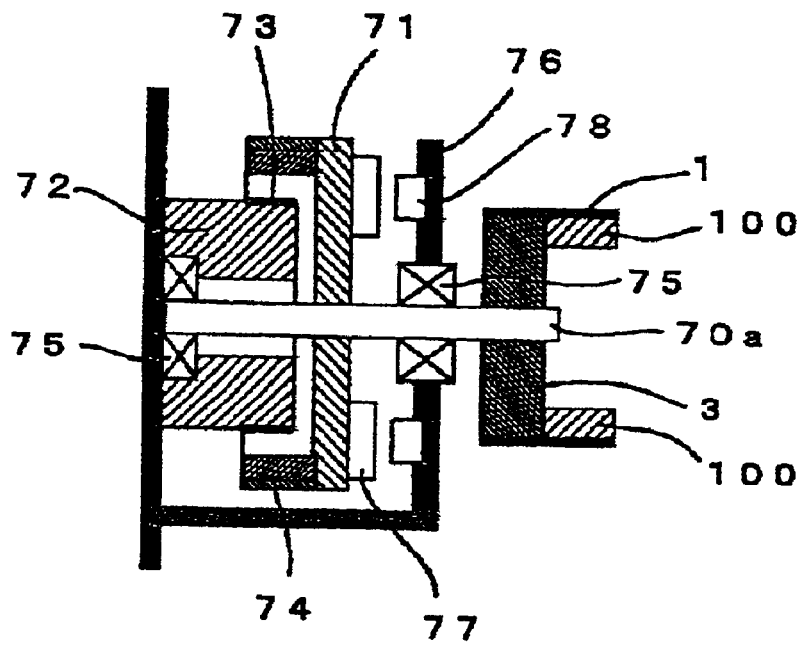
FIG. 21 is a section showing a relation between an outer rotor coreless motor, a belt and a drive roller included in a conventional, tandem image forming apparatus.

The motor shown in FIG. 20 has multifunction precision parts constructed integrally with each other. The motor of FIG. 20 may be positioned at the other end of the belt 1 as well. Driving the belt 1 at both sides is more desirable than driving it at one side because the former does not bring about twist and therefore allows the rigidity and therefore wall thickness of the roller 100 to be reduced. For comparison, FIG. 21 shows another specific configuration of the drive roller 3. As shown, the drive roller 3 is spaced from the outer rotor 71. This configuration has a problem that a transmission shaft 70 has low rigidity against torsion and therefore brings about resonance.

In Laid-Open Publication No. 6-271130, a motor is accommodated in and extends over the entire axial length of the drive roller, i.e., even over the image forming zone of the drive roller. This configuration, however, causes heat output from the motor to heat a belt and effects, in a system using an intermediate image transfer belt, a toner image transferred to an intermediate image transfer belt, thereby degrading image quality. The illustrative embodiment is free from this problem and moreover reduces the overall width of the apparatus because the outer rotor portion supports the belt, too.

Figure 22:
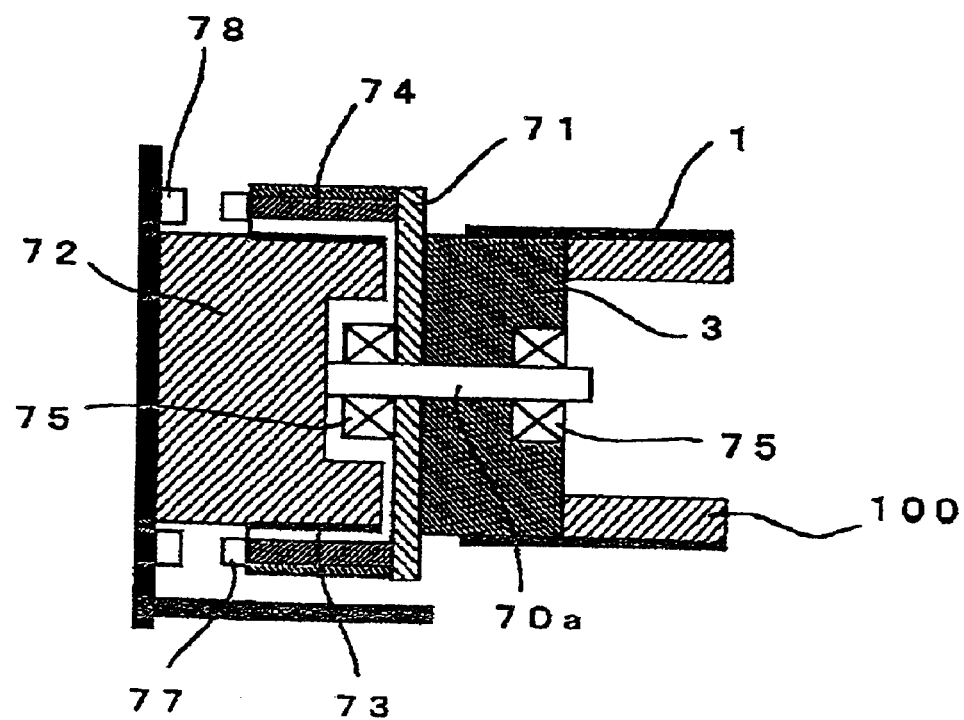
FIGS. 22 and 23 are sections each showing a particular relation between the outer rotor coreless motor, the belt and the drive roller particular to the illustrative embodiment.
Figure 23:
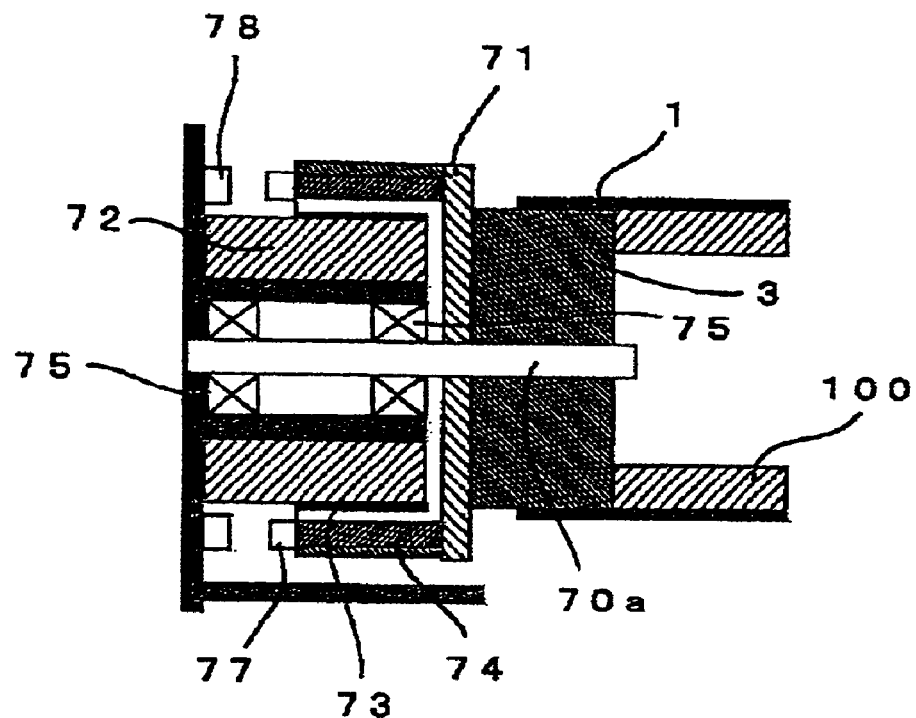

FIGS. 22 and 23 each show another specific configuration of the drive roller and outer rotor motor. As shown, the drive roller 3 (100) is connected to the end face of the outer roller 71. This configuration is particularly desirable when the diameter of the drive roller 3 cannot be increased or when the output torque of the motor should be increased. A greater motor radius implements a greater flywheel effect and reduces the problem of the configuration shown in FIG. 21 and relating to the rigidity of the transmission shaft 70a. Assume a configuration in which the drive roller is directly connected to an inner rotor motor. Then, the connecting portion has a smaller area than the connecting portion of the outer rotor motor type of configuration for a given outside diameter, resulting in low rigidity as to connection.

The encoder is designed in consideration of heat. The encoder disk 77 must therefore be formed of a heat-resistant material, e.g., metal.

The encoder disk 77 and sensor 78 shown in any one of FIGS. 20, 22 and 23 may be positioned at the outside, as shown in FIG. 21. This alternative position desirably reduces the influence of heat generated inside the motor. However, the rigidity of the transmission shaft 70a (material and radius) must be sufficiently taken into account because the drive roller 3 is spaced from the outer rotor 71.

While FIGS. 20 and 22 each show an outer rotor type of bearing arrangement, the arrangement shown in FIGS. 23 allows an inter rotor type of bearing to be used. When the outer rotor type of bearing shown in FIG. 20 or 22 is used, the shaft 70b is not rotatable, but is fixed. In FIG. 22 or 23, the yoke 74 of the outer rotor 71 and drive roller 3 or the yoke 74 and member that holds the permanent magnet 74 may be molded integrally with each other by using a magnetic material, if desired. This guarantees accurate dynamic balance and further promotes stable drive. To further enhance accuracy, dynamic balance may be set up after the motor and drive roller have been constructed integrally with each other.

The concept described above is similarly applicable to the drum 5. This will be understood by replacing the drive roller 3 shown in any one of FIGS. 21 through 23 with the drum 5 or replacing the belt 1 shown in FIG. 20 with the drum 5. However, the drum 5 deteriorates and must therefore be replaced. For the replacement of the drum 5, the end face of the outer roller shown in FIG. 22 or 23 may be formed with a plurality of lugs capable of mating with recesses formed in the end face of the drum. For the same purpose, the outer roller shown in FIG. 20 may be configured to enter a bore formed in the drum and then fixed together by screws, which prevent the two members from rotating relative to each other.

(8) Outer Rotor Type of Coreless Brushless Motor

Figure 24:
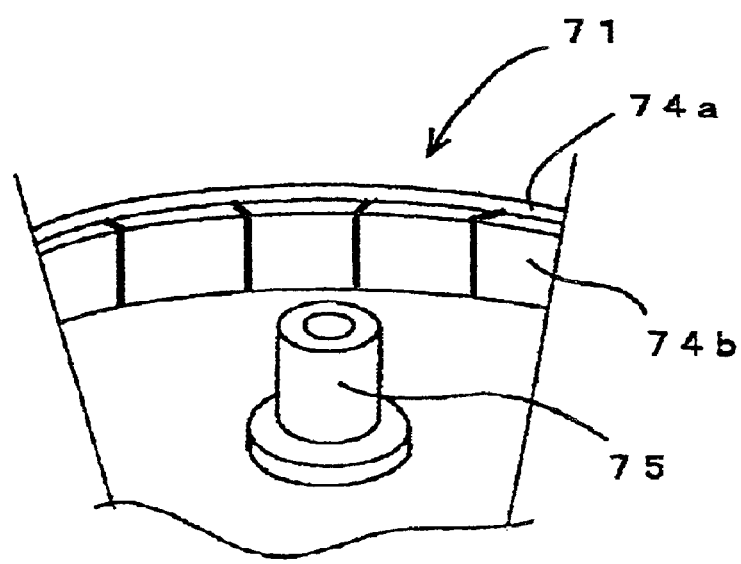
FIG. 24 is a fragmentary isometric view of an outer roller included in the coreless motor of the illustrative embodiment.
Figure 25:
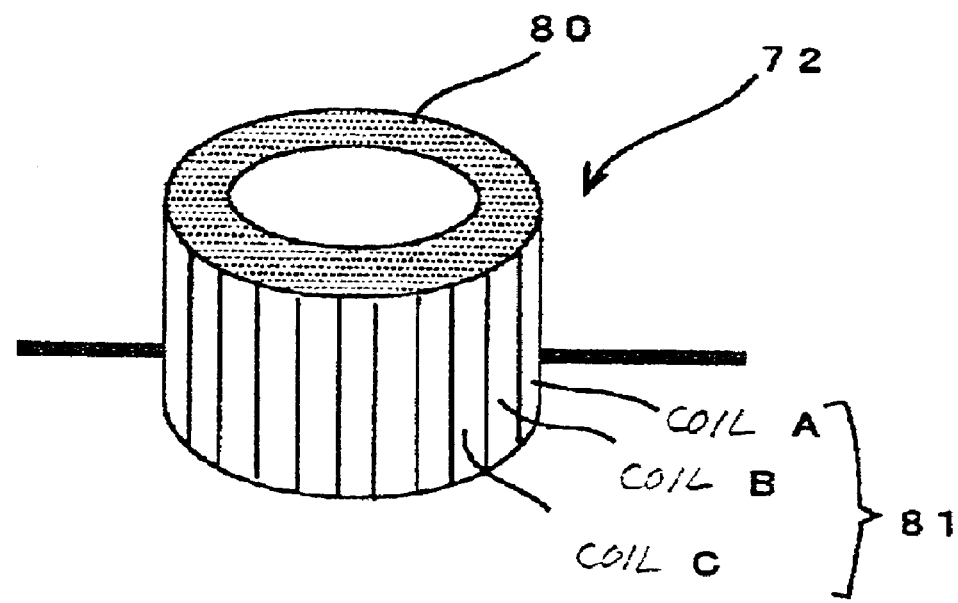
FIG. 25 is an isometric view showing a stator also included in the coreless motor of the illustrative embodiment.

FIGS. 24 and 25 show a specific configuration of an outer rotor type of coreless brushless motor. As shown in FIG. 24, the outer rotor 71 has a partly cut yoke 74a and a permanent magnet 74b surrounded by the yoke 74a. As for magnetic poles, the permanent magnet 74b has N and S poles alternating with each other in the circumferential direction or is implemented by pieces of magnets so arranged.

Figure 26:
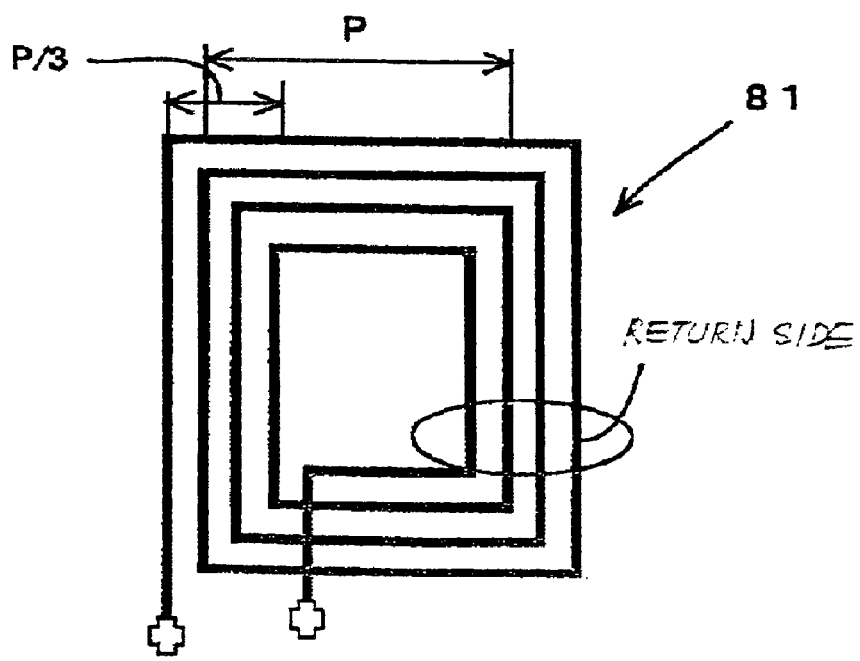
FIG. 26 shows a coil further included in the coreless motor of the illustrative embodiment.
Figure 27:
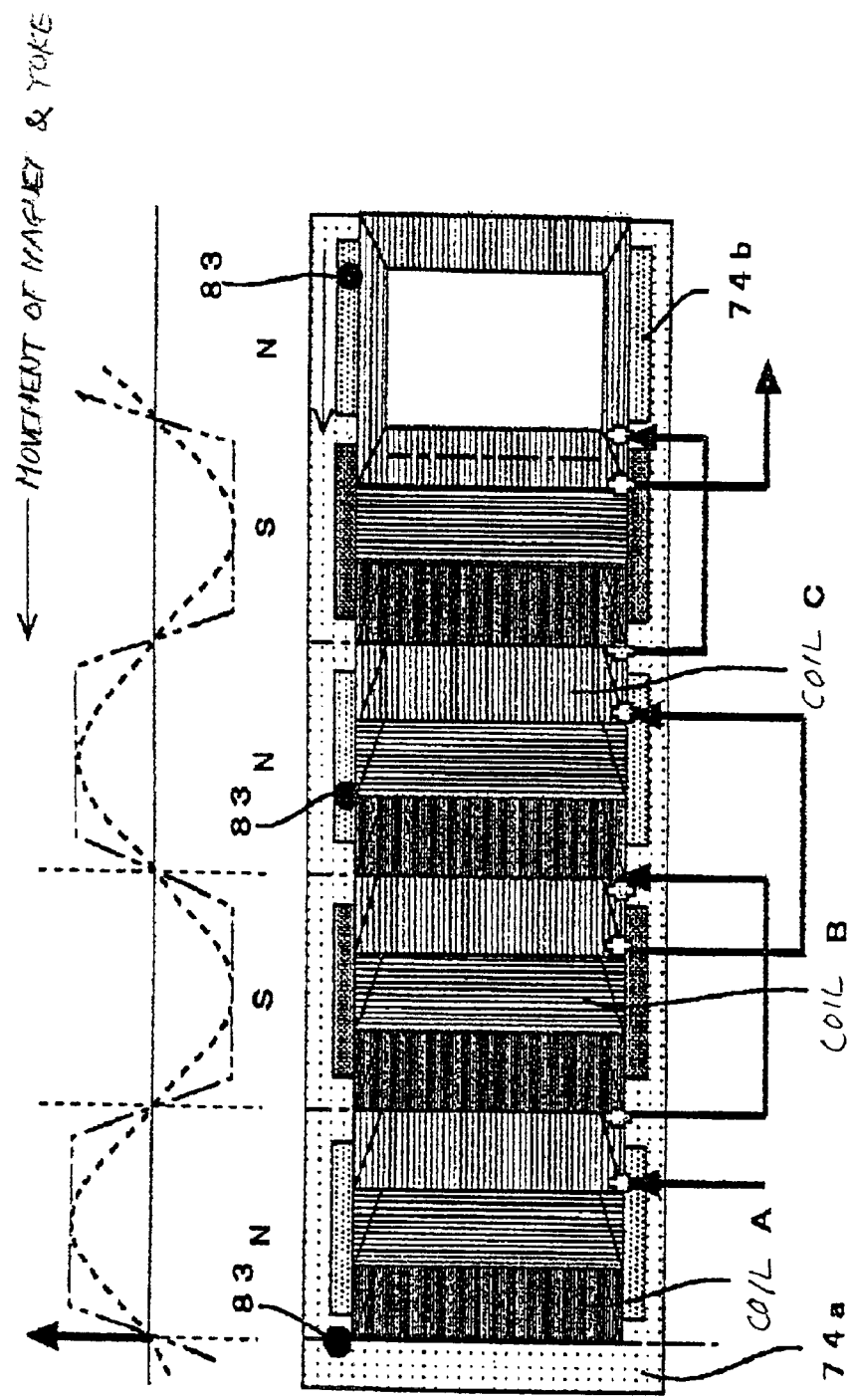
FIG. 27 is a view showing a coil mounting portion included in the coreless motor of the illustrative embodiment.

As shown in FIG. 25, a stator has a yoke 80 and a coil 81 made up of coils each having a configuration shown in FIG. 26. FIG. 27 shows how such coils are arranged to constitute the coil 81. As shown, the coils are arranged around the stator with their phases being shifted in the direction in which the outer rotor moves. In FIG. 27, coils A, B and C each having a particular phase are shown by way of example. The permanent magnet 74b, FIG. 24, surrounded by the yoke 74a moves in a direction indicated by an arrow when the motor is in rotation.

Assume that one pole, i.e., S pole or N pole of the permanent magnet 74b has a pitch of P. Then, as shown in FIG. 26, the width Cw of the coil 81, as measured in the direction perpendicular to the direction of rotation of the rotor, is P/3. The distance between the right and left widths Cw of the coil is P. To implement three different phases, every third coils are connected to the same phase.

FIG. 27 shows only the connection of the coils C. To regulate the direction in which a thrust is generated with respect to the direction of current, the direction of current flow differs from the odd coil to the even coil. More specifically, in FIG. 26, the connection to two coil terminals differs from the odd coil to the even coil. This is because the odd coil and even coil are opposite to each other as to the direction of an interlinked magnetic field.

In FIG. 27, Hall sensors or Hall elements each sense the strength and direction of a magnetic field passing thereover. The strength of the shifting field generated by the yoke 74a, permanent magnet 74b and stator yoke is represented by a sinusoidal wave and a trapezoidal wave. Although the coreless motor does not bring about a cogging torque, it brings about torque ripples. By bringing the torque ripple configuration close to the trapezoidal wave having long straight portion as far as possible, it is possible to implement an efficient motor with a minimum of torque ripples. Generally, image quality is little susceptible to the variation spatial frequency ascribable to the oscillation of the driveline if the frequency is low, but becomes susceptible as the frequency rises. The image quality has the maximum value, i.e., again becomes little susceptible to the spatial frequency as the frequency further rises, as well known in the art. The torque ripples should, of course, be as small as possible from the image quality standpoint.

In the three-phase motor having the above configuration, assume that the permanent magnet portion of the rotor has a circumferential length of L. Then, L/2P=n (natural number) pairs of N and S poles are available. Therefore, torque ripples have a fundamental spatial frequency of fs expressed as:

$$fs = 6n/(\pi D) \qquad \text{Eq. (32)}$$

where D denotes the diameter of the drive roller.

Figure 28:
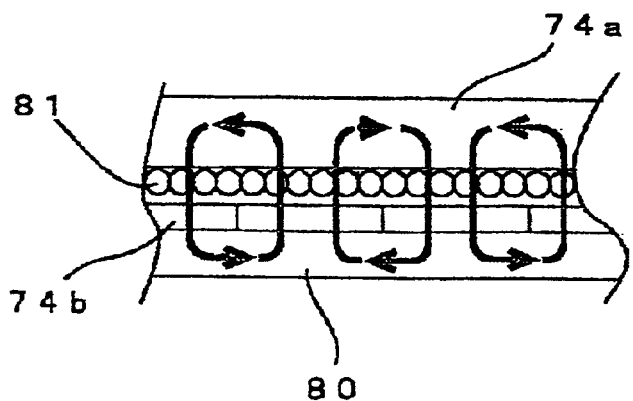
FIG. 28 is a view showing the flows of magnetic fluxes through a yoke and magnets arranged in the coreless motor of the illustrative embodiment.

The fundamental frequency of torque ripples decreases with a decrease in the value n, effecting image quality little. However, if the value n is excessively small, then the yoke 74a of the outer roller must be thickened. More specifically, as shown in FIG. 28, when the permanent magnet 74b of one pole is increased in width, the amount of magnetic flux extending through the yoke 74a to the adjoining permanent magnet 74b increases and requires a broader magnetic path, resulting in an increase in the inertia of the rotor. In FIG. 28, arrows indicate the flows of magnetic fluxes. This, however, does not matter at all in the case of a driveline for a printer or a copier, because stability of steady, constant-speed operation is important; rather, great inertia is desirable. The outer rotor motor has, of course, greater inertia than the inner rotor motor for a given thrust because it has a rotary portion at the outside thereof. In this respect, too, the outer rotor motor is more advantageous for a printer or a copier than the inner rotor motor.

While the fundamental spatial frequency of torque ripples decreases with an increase in the diameter of the drive roller, the diameter must be determined in consideration of the load to be transferred from the belt to the drive roller. When the diameter of the drive roller increases for a given motor torque, the force that pulls the belt is reduced.

On the other hand, assume that the allowable outside diameter of the motor is fixed beforehand for system reasons. Then, in the aspect of motor efficiency, the bore of the magnetic circuit should preferably be as close to the outer circumference as possible in order to increase the torque for a given thrust. In this sense, the value n of the Eq. (32) must be increased.

It will therefore be seen that the optimal value n is one that makes the fundamental spatial frequency fs of torque ripples as high as possible. The value n may be increased to increase the torque ripple frequency. This, however, reduces the pole pitch of the magnets excessively and reduces the size of the coils excessively, making the production of the motor difficult. Further, a motor drive frequency becomes high and brings about various losses and makes control difficult.

Figure 29:
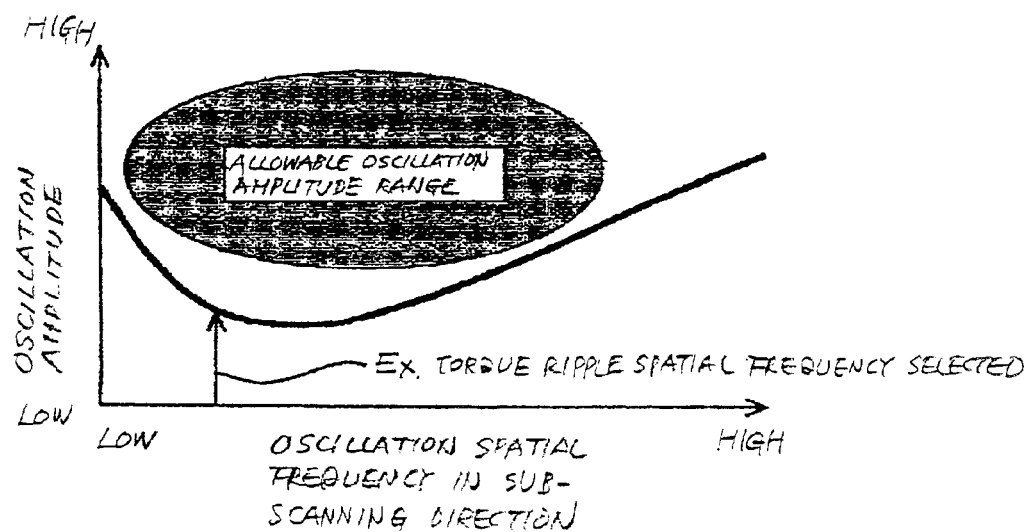
FIG. 29 is a graph showing a relation between the allowable limit amplitude of the oscillation of a drive system and a spatial frequency for attaining high image quality.

FIG. 29 is a graph showing a range of oscillation amplitudes in the subscanning direction (direction of movement of the belt) allowable for implementing high image quality. In FIG. 29, the ordinate and abscissa indicate the oscillation amplitude and the oscillation spatial frequency of the driveline, respectively. The oscillation spatial frequency shown in FIG. 29 corresponds to the spatial frequency fs of torque ripples represented by the Eq. (32). When the transmission mechanism is implemented by the conventional gear train, it is difficult to set torque ripples at the low frequency side because the torque variation frequency ascribable to torque ripples of cogging increases by a gear ratio. To set torque ripples at the high frequency side, it is necessary to increase the gear ratio because the gear train increases the oscillation amplitude, resulting in a sophisticated configuration. The illustrative embodiment sets torque ripples at the low frequency side. This is also true with the drive of the photoconductive drum. More specifically, a torque ripple frequency can be determined if the diameter of the drive roller in Eq. (32) is replaced with the diameter of the drum.

Figure 30:
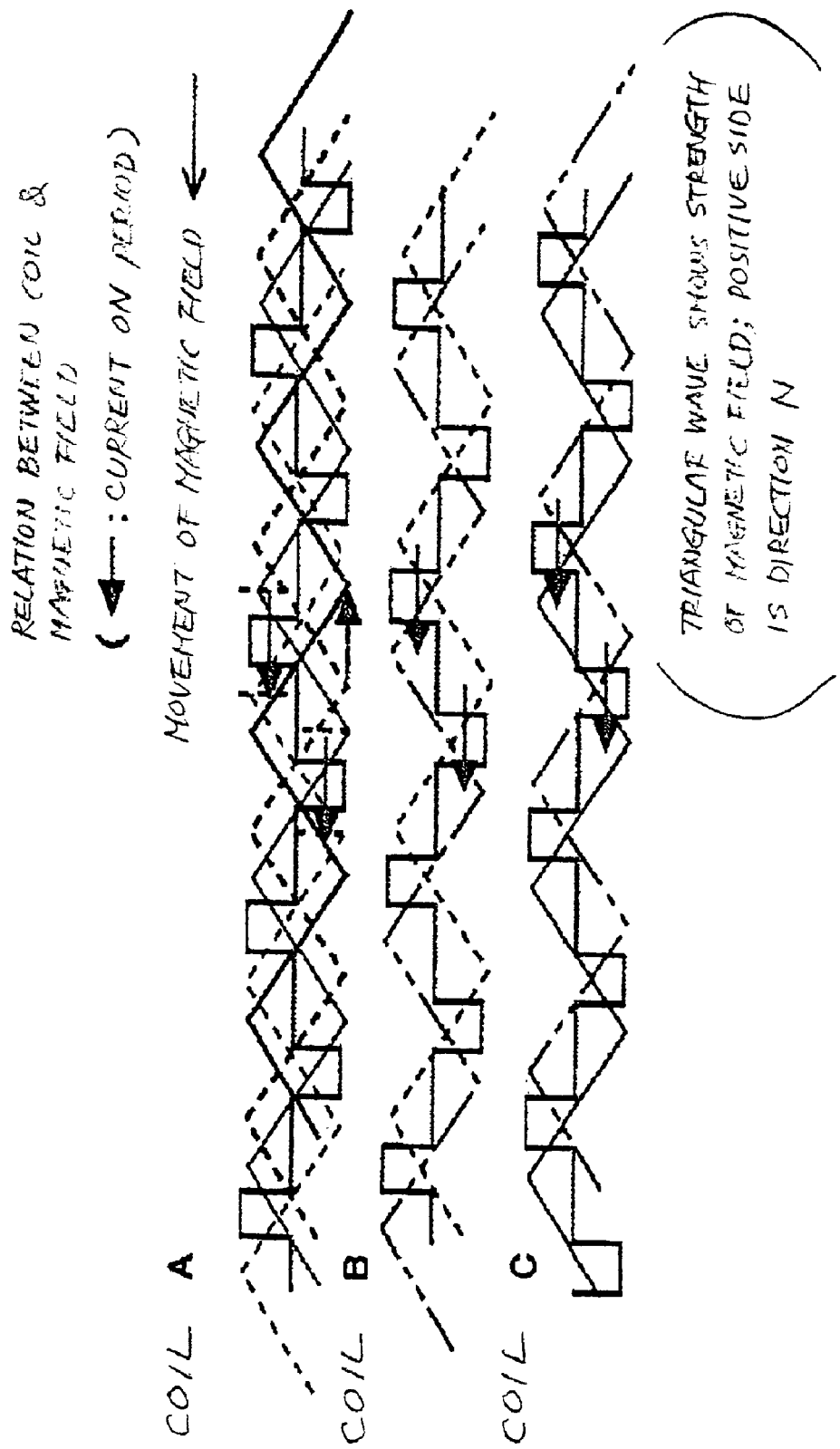
FIG. 30 shows a relation between coils and magnetic fields in the coreless motor.

FIG. 30 shows a relation between the coils and magnetic fields. To facilitate an understanding, FIG. 30 shows only one coil of each phase (left coil as viewed in FIG. 26), shows odd coils and even coils at the lower portion and upper portion, respectively, and shows triangular waveforms representative of magnetic fields. Because the coils on the stator yoke do not move, magnetic fields move, as illustrated. The magnetic fields are assumed to move from the left to the right in FIG. 30. The coil at the return side (right side in FIG. 26) is positioned such that the magnetic flux interlinked to the flow of a current is precisely opposite to the magnetic flux of the left coil. The right coil therefore generates the same thrust as the left coil.

As for each even coil, assume that a current is fed from the time when the zero-crossing of the rising portion of the waveform and the left edge of the coil cross each other to the time when the zero-crossing of the falling portion of the waveform moves away from the right edge of the coil after the magnetic field has moved by 2P/3, as indicated by an arrow in FIG. 30. Then, the even coil generates a thrust for rotation. At this instant, a current flows through the odd coil from the fall to the rise of the magnetic field and flows in opposite direction to the current of the even coil due to the connection of the coils stated earlier; the magnetic flux interlinked to the current is also opposite in direction. Consequently, the thrust generated by the odd coil is coincident in direction with the thrust generated by the even coil. After the magnetic field has moved by another P/3, a current flows through the even coil from the fall to the rise of the magnetic field in the direction opposite to the above direction. Because the coils are affixed to the stator yoke, the rotor moves in the direction opposite to the direction in which the thrust acts. Considering this, the illustrative embodiment causes a current to flow in a direction according to the left-hand rule.

Figure 31:
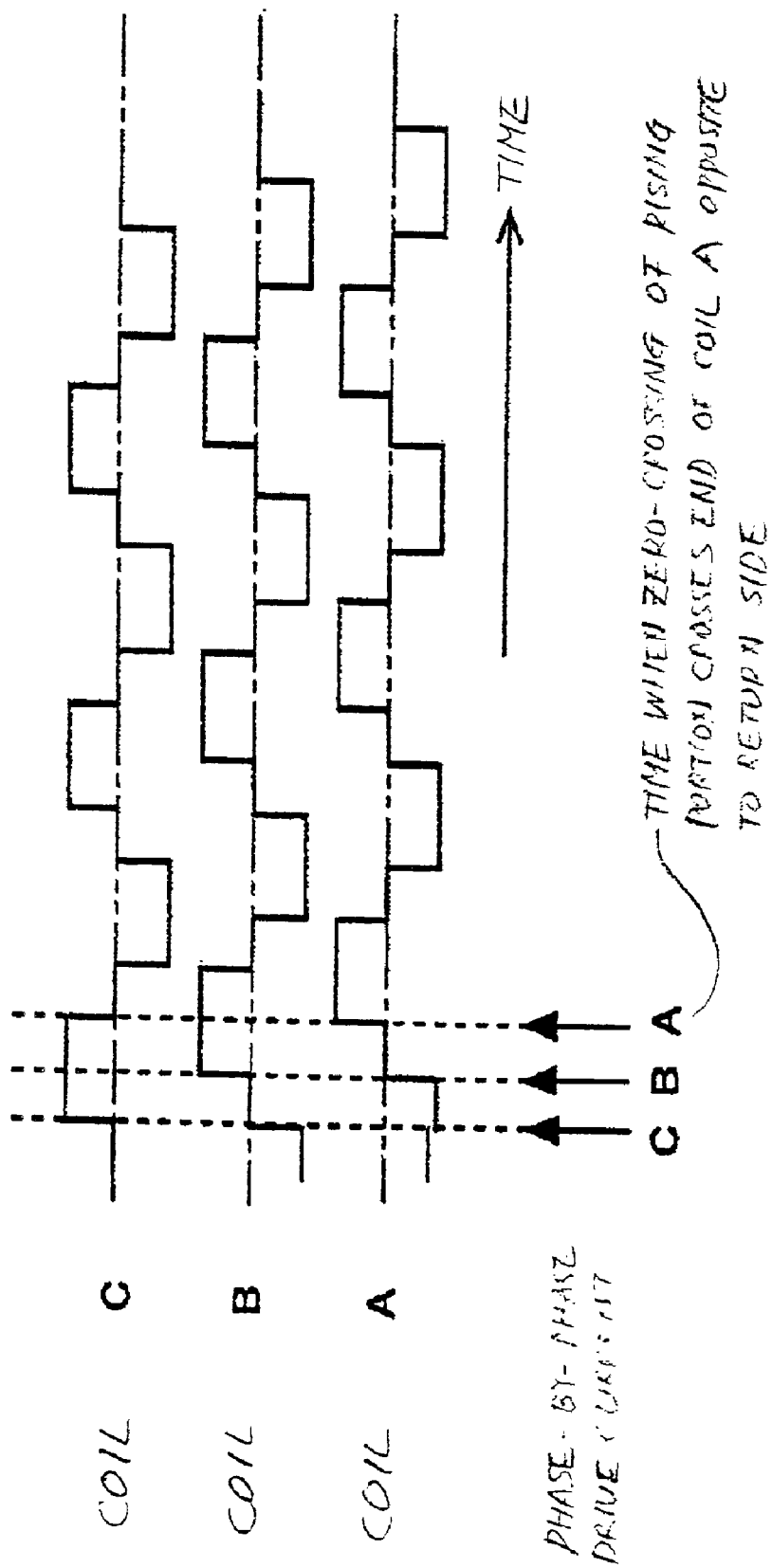
FIG. 31 is a chart showing ON/OFF timings and directions of currents to flow through the coils.

FIG. 31 shows the ON/OFF timings and directions of currents to flow through the coils, which are connected as shown in FIG. 27, when the motor is driven at a constant speed. The Hall sensors 83 each being assigned to one of the three phases are positioned at the edges of the coils where the magnetic fluxes can pass through the Hall sensors 83, as shown in FIG. 27 specifically. In this condition, the Hall sensors 83 detect the above timings and directions. More specifically, the Hall sensors 83 each generate an output proportional to the strength of a magnetic flux. It is therefore possible to control the ON/OFF timings and directions of currents to be fed to three coil phases, FIG. 31, by detecting the output of the Hall sensors 83.

Figure 32:
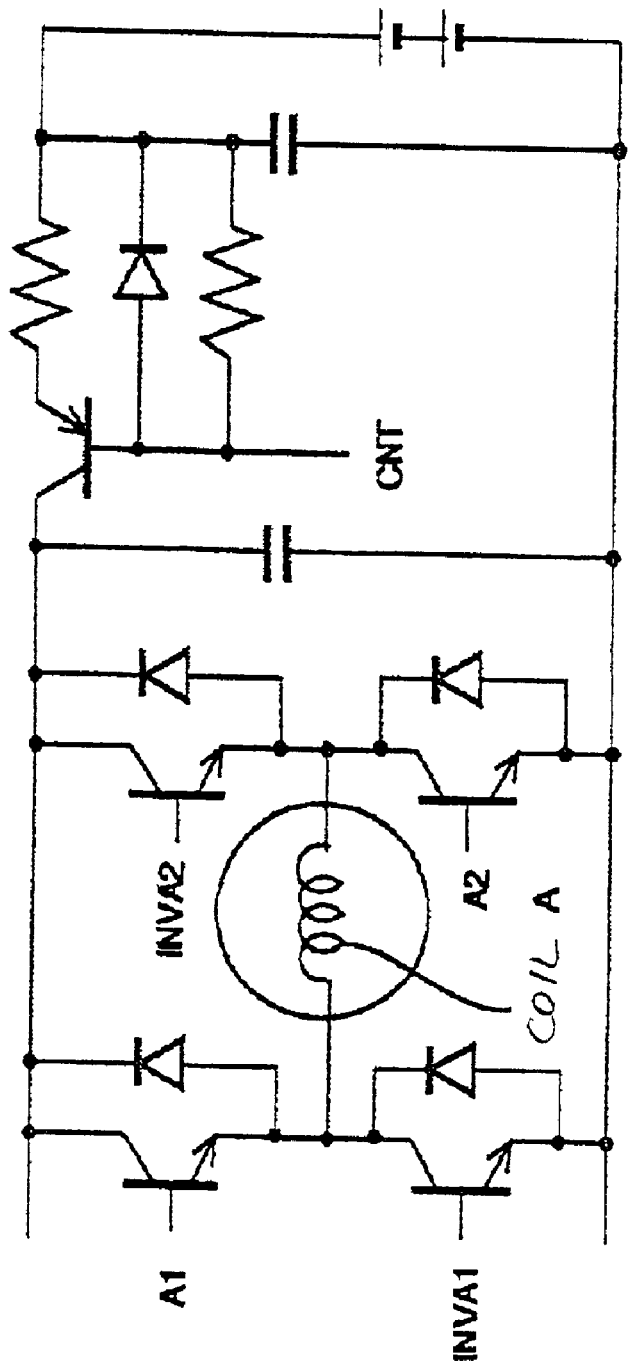
FIG. 32 is a circuit diagram showing circuitry for controlling the ON/OFF timings and directions of the currents.

FIG. 32 shows a conventional H type circuit for controlling the timing, direction and size of a current to be fed to a single coil phase (phase A in FIG. 32). As shown, when inputs A1 and A2 are turned on at substantially the same time, a current flows through the coil. When inputs INVA1 and INVA2 are turned on at substantially the same time, a current flows in the direction opposite to the direction of the above current. An input CNT controls the size of the current to be fed to the motor. The control circuitry described with reference to FIG. 11 must sense the counter electromotive force of the motor. By contrast, in FIG. 32, a resistor is serially connected to each coil. By sensing a voltage on the end of each coil and a terminal voltage of the resistor and then executing calculation and mixing, it is possible to detect a voltage proportional to the rotation speed of the motor.

Figure 33:
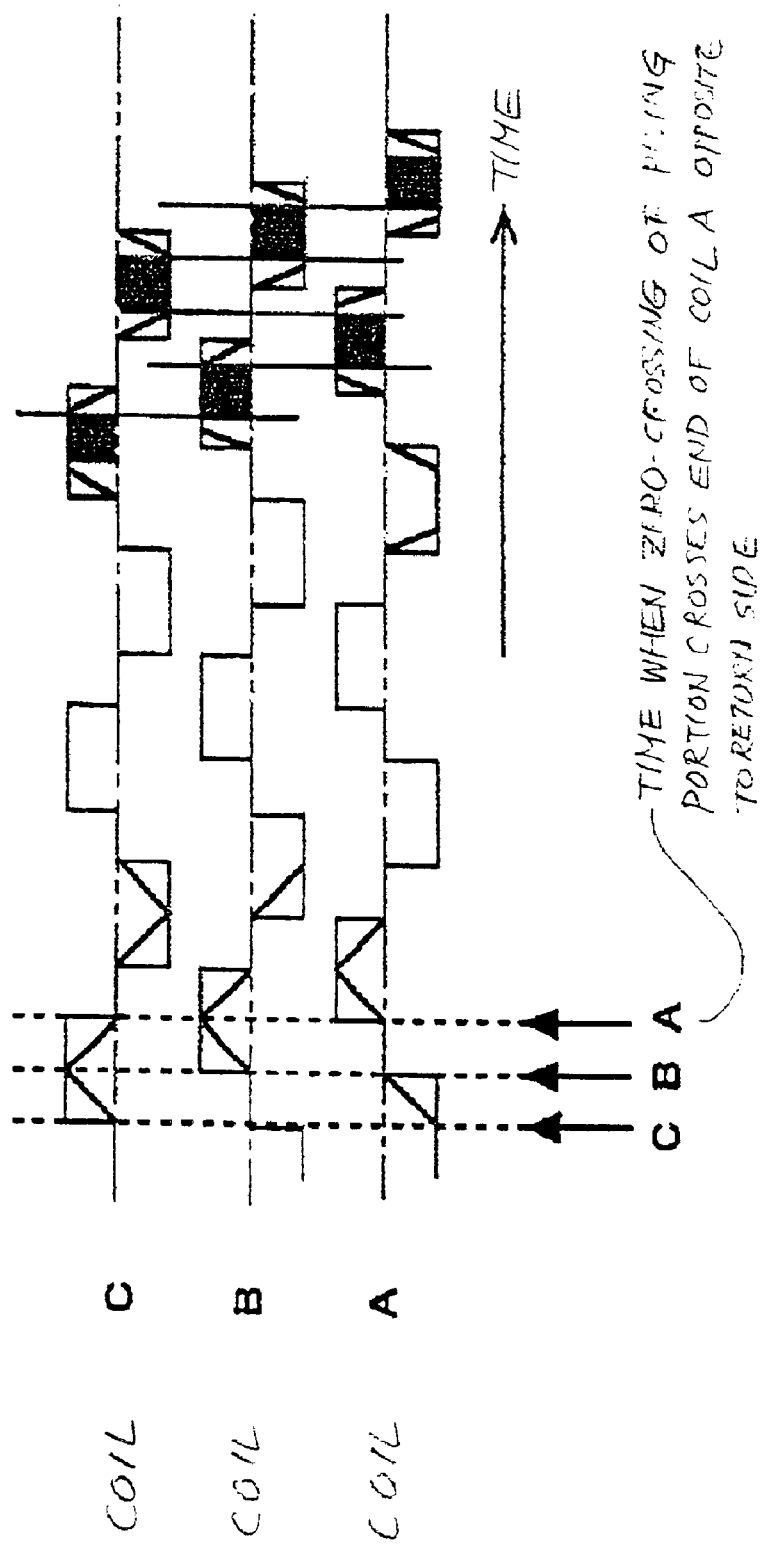
FIG. 33 shows, assuming triangular and trapezoidal, shifting field waveforms, the strengths of magnetic fields interlinked to the currents by superposing them on FIG. 31.

FIG. 33 shows, assuming triangular and trapezoidal shifting field waveforms, the strengths of magnetic fluxes linked to the coils by superposing them on the waveforms of FIG. 31. As shown, assuming that the drive current value is constant, then the product of the current waveform and magnetic field directly turns out a thrust. As for ideal triangular waveforms, although difficult to implement, the combined thrust of the three coils phases remains constant at all times. However, efficiently is lowered because a current constantly flows even at portions where the magnetic field is weak. A magnetic field whose waveform is close to a sinusoidal wave lowers motor efficiency and causes ripples to appear in the combined thrust.

Thrust ripples appear even in the case of the trapezoidal waveforms shown in FIG. 33. However, in FIG. 33, currents are not fed to the three coil phases at the same time, but are fed independently of each other. This, coupled with the fact that the current switching time between the phases is made as short as possible, realizes a motor that is efficient and suffers from a minimum of thrust ripples.

Hereinafter will be described an alternative embodiment of the present invention in which the Hall sensors 83 are replaced with sensors arranged on an encoder and functioning in the same manner as the Hall sensors 83. In the illustrative embodiment, the sensors sense marks provided on an encoder disk. The number of sensors is the same as the number of the Hall sensors 83; the illustrative embodiment uses three sensors. Marks are provided on the encoder disk at positions corresponding to the bore of the magnetic circuit.

The marks reflect incident light when the magnetic flux shown in FIG. 27 extends toward the positive side (N pole), but transmits it when the magnetic flux extends toward the negative side (S pole). Such a relation between the direction of the magnetic flux and the mark may, of course, be inverted. Also, a reflection type or a transmission type sensing system may be used, as desired. The encoder disk with the marks is mounted to the outer rotor such that the directions of magnetic fields in the bore and the zero-crossing points of the magnetic fields coincide with points between the marks and the portions where they are absent. The sensors of the encoder, like the Hall sensors, each are assigned to a particular coil phase. When optical sensors are used, it is not necessary to locate them at positions interlinked to the magnetic fluxes or to arrange the coils by taking account of mounting. This allows the coil length relating to the generation of a thrust to be increased and thereby implements a more efficient motor.

Further, one of optical sensors responsive to the marks may be used as a start position sensor for sensing a reference angular position of one rotation. While this can be done with a Hall sensor also, a Hall sensor makes it difficult to sharply raise a waveform for enhancing positional accuracy and must therefore be accompanied by an extra sensor for an accuracy purpose. By contrast, the optical arrangement allows a beam to be incident to the encoder disk to be narrowed down or allows a slit to be positioned at the sensing side. Therefore, a highly accurate reference position sensor is achievable without resorting to any extra sensor.

Figure 34A:
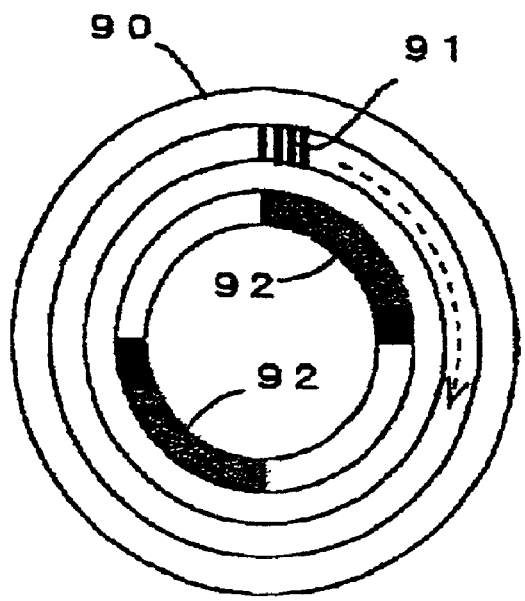
FIGS. 34A and 34B are views showing an encoder provided with marks unique to the illustrative embodiment.
Figure 34B:
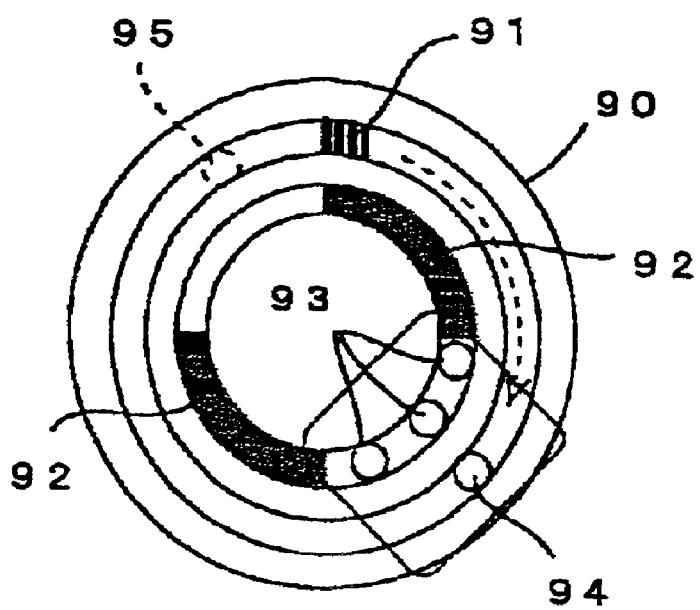

FIGS. 34A and 34B show a specific configuration of an n=2 encoder using the principle described above. As shown in FIG. 34A, an encoder disk 90 is provided with a plurality of timing marks 91 spaced in the circumferential direction for sensing rotation angles. FIG. 34A shows only part of the timing marks 91. Further, marks 92 are provided on the encoder disk 90 and correspond to magnetic fields to be generated by the rotor. FIG. 34B shows the layout of three sensors 93 responsive to positions where the magnetic field varies and a single timing sensor 94. One of the sensors 93 is implemented as a start position sensor mentioned earlier.

The sensors 93 and 94 that can be concentratedly arranged simplify wiring and therefore mounting. As shown in FIG. 34B, a sensor 95 indicated by a dotted line is used when the encoder has great eccentricity. The sensor 95 senses timing signals different in phase by 180 degrees at the same time. The output of the sensor 95 is used to cancel the influence of eccentricity.

In summary, it will be seen that the endless belt driving device and image forming apparatus of the present invention has various unprecedented advantages, as enumerated below.

(1) The allowable eccentricity of a roller is confined in a range that does not effect the variation of a belt speed. The roller therefore rotates at a constant angle and allows a belt to stably, accurately move at a constant speed.

(2) Accurate dynamic balance is set up in a drive roller portion on the belt, insuring stable constant angular velocity control. This further promotes stable constant-speed control over the belt.

(3) Even when a rotary body associated with the belt is eccentric, the belt is free from slacking and does not slip on the rotary body. The rotary body and belt can therefore stably move integrally with each other.

(4) The belt accurately contacts the peak of the cross-section of the rotary body. Therefore, so long as the belt moves at a constant speed, it can move the rotary body even if the rotary body is eccentric. Stated another way, the rotary body to be driven by the belt can move at a constant angular velocity, which is easy to control.

(5) There can be obviated the variation of a transmission speed, oscillation and the deterioration of transmission rigidity ascribable to a gear train, a belt or similar transmission mechanism. There can also be obviated the deterioration of image quality ascribable to the amplitude and variation frequency of torque ripples. The image forming apparatus is therefore small size and high quality.

(6) Tortional rigidity is free from deterioration ascribable to the drive torque of a motor transferred to the drive roller via a shaft coaxial with the motor. This realizes high rigidity and stable, accurate control. An outer rotor included in the motor and drive roller are constructed integrally with each other to facilitate the adjustment of dynamic balance, thereby insuring high image quality. Further, a decrease in the required number of bearings implements cost reduction, easy machining, and size reduction.

(7) The image forming apparatus reduces torque variation ascribable to the torque ripples of the motor and increases motor efficiency. The apparatus therefore saves power and insures high image quality.

(8) An encoder disk provided with particular marks obviates for the need for Hall sensors for switching a motor phase and therefore allows coils to be arranged without regard to the positions of Hall sensors. This promotes efficient use of the coils and thereby increases motor efficiency. Moreover, because leads for Hall sensors do not have to be taken account and because most of optical sensors can be concentratedly arranged, easy mounting is promoted. In addition, the apparatus is low cost because it does not need an extra sensor for sensing a start angular position sensor or bearings for the encoder.

Various modifications will become possible for those skilled in the art after receiving the teachings of the present disclosure without departing from the scope thereof.

What is claimed is:

1. A device for driving an endless belt, comprising:
   belt driving means positioned at one end of the belt and comprising a first roller for moving said belt;
   at least one rotary body arranged side by side in a direction of movement of the belt and pressed against said belt either directly or indirectly to be thereby rotated by said belt; and
   a second roller adjoining said first roller and contacting the belt at a side where said rotary body is positioned;
   wherein said first roller and said second roller each have allowable eccentricity reduced to a range that does not effect a variation of a speed of the belt.

2. The device as claimed in claim 1, wherein said belt driving means further comprises a motor.

3. The device as claimed in claim 2, wherein dynamic balance is set up on a rotary portion of said motor and said first roller integrally.

4. The device as claimed in claim 3, wherein said first roller and a shaft of said first roller are molded integrally with each other.

5. The device as claimed in claim 2, further comprising an eccentricity adjusting mechanism assigned to at least one of said first roller and said second roller.

6. The device as claimed in claim 5, wherein dynamic balance is set up on a rotary portion of said motor and said first roller integrally.

7. The device as claimed in claim 6, wherein said first roller and a shaft of said first roller are molded integrally with each other.

8. A device for driving an endless belt, comprising:
   belt driving means positioned at one end of the belt and comprising a drive roller for moving said belt;
   at least one rotary body arranged side by side in a direction of movement of the belt and pressed against said belt either directly or indirectly to be thereby rotated by said belt; and
   a stationary guide body adjoining said drive roller and continuously contacting the belt at a side where said rotary body is positioned;

wherein said drive roller has allowable eccentricity reduced to a range that does not effect a variation of speed of the belt, said belt driving means further comprises a motor, and dynamic balance is set up on a rotary portion of said motor and said drive roller integrally.

9. A device for driving an endless belt, comprising:

belt driving means positioned at one end of the belt and comprising a drive roller for moving said belt;

at least one rotary body arranged side by side in a direction of movement of the belt and pressed against said belt either directly or indirectly to be thereby rotated by said belt; and a stationary guide body adjoining said drive roller and continuously contacting the belt at a side where said rotary body is positioned;

wherein said drive roller has allowable eccentricity reduced to a range that does not effect a variation of speed of the belt, said belt driving means further comprises a motor, said drive roller and a shaft of said drive roller are molded integrally with each other, and dynamic balance is set up on a rotary portion of said motor and said drive roller integrally.

10. An apparatus comprising:

belt driving means positioned at one end of an endless belt, which is one of at least an intermediate image transfer belt and a sheet conveying belt, and comprising a drive roller for moving said belt; and at least one photoconductive drum arranged side by side in a direction of movement of the belt and pressed against said belt either directly or indirectly to be thereby rotated by said belt;

wherein at least one of said drive roller and said photoconductive drum is directly driven by an outer rotor coreless motor.

11. The apparatus as claimed in claim 10, wherein torque ripples generated by said outer rotor coreless motor are set at a spatial frequency close to a maximum value in an allowable, torque ripple spatial frequency range at a low frequency side, which does not effect image quality.

12. An apparatus comprising:

belt driving means positioned at one end of an endless belt, which is one of at least an intermediate image transfer belt and a sheet conveying belt, and comprising a drive roller for moving said belt; and at least one photoconductive drum arranged side by side in a direction of movement of the belt and pressed against said belt either directly or indirectly to be thereby rotated by said belt;

wherein at least one of said drive roller and said photoconductive drum is directly driven by an outer rotor coreless motor;

wherein torque ripples generated by said outer rotor coreless motor are set at a spatial frequency close to a maximum value in an allowable, torque ripple spatial frequency range at a low frequency side, which does not effect image quality;

wherein said outer rotor coreless motor comprises an outer rotor functioning as said drive roller at a same time.

13. The apparatus as claimed in claim 12, wherein the outer rotor comprises an encoder disk on which is at least one of timing marks for sensing a signal for rotation control and a mark for sensing a signal that switches a phase of a current to be fed to each of different coil phases.

14. The apparatus as claimed in claim 13, wherein said mark functions as a mark for sensing a start signal output for each rotation at a same time.

15. An apparatus comprising:

belt driving means positioned at one end of an endless belt, which is one of at least an intermediate image transfer belt and a sheet conveying belt, and comprising a drive roller for moving said belt; and at least one photoconductive drum arranged side by side in a direction of movement of the belt and pressed against said belt either directly or indirectly to be thereby rotated by said belt;

wherein at least one of said drive roller and said photoconductive drum is directly driven by an outer rotor coreless motor;

wherein torque ripples generated by said outer rotor coreless motor are set at a spatial frequency close to a maximum value in an allowable, torque ripple spatial frequency range at a low frequency side, which does not effect image quality;

wherein said outer rotor coreless motor comprises an outer rotor that is formed integrally with said drive roller.

16. The apparatus as claimed in claim 15, wherein the outer rotor comprises an encoder disk on which is at least one of timing marks for sensing a signal for rotation control and a mark for sensing a signal that switches a phase of a current to be fed to each of different coil phases.

17. The apparatus as claimed in claim 16, wherein said mark functions as a mark for sensing a start signal output for each rotation at a same time.

18. An apparatus comprising:

belt driving means positioned at one end of an endless belt, which is one of at least an intermediate image transfer belt and a sheet conveying belt, and comprising a drive roller for moving said belt; and at least one photo conductive drum arranged side by side in a direction of movement of the belt and pressed against said belt either directly or indirectly to be thereby rotated by said belt;

wherein at least one of said drive roller and said photoconductive drum is directly driven by an outer rotor coreless motor;

wherein torque ripples generated by said outer rotor coreless motor are set at a spatial frequency close to a maximum value in an allowable, torque ripple spatial frequency range at a low frequency side, which does not effect image quality;

wherein said outer rotor coreless motor is driven such that timings for feeding currents to coils of different phases substantially do not overlap each other when a flux density of a bore magnetic field is substantially constant.

19. The apparatus as claimed in claim 18, wherein the outer rotor comprises an encoder disk on which is at least one of timing marks for sensing a signal for rotation control and a mark for sensing a signal that switches a phase of a current to be fed to each of different coil phases.

20. The apparatus as claimed in claim 19, wherein said mark functions as a mark for sensing a start signal output for each rotation at a same time.

21. An apparatus comprising:

belt driving means positioned at one end of an endless belt, which is one of at least an intermediate image transfer belt and a sheet conveying belt, and comprising a drive roller for moving said belt; and at least one photoconductive drum arranged side by side in a direction of movement of the belt and pressed against said belt either directly or indirectly to be thereby rotated by said belt;

wherein at least one of said drive roller and said photoconductive drum is directly driven by an outer rotor coreless motor;

wherein torque ripples generated by said outer rotor coreless motor are set at a spatial frequency close to a maximum value in an allowable, torque ripple spatial frequency range at a low frequency side, which does not effect image quality;

wherein the outer rotor comprises an encoder disk on which is at least one of timing marks for sensing a signal for rotation control and a mark for sensing a signal that switches a phase of a current to be fed to each of different coil phases.

22. The apparatus as claimed in claim 21, wherein said mark functions as a mark for sensing a start signal output for each rotation at a same time.

23. An apparatus comprising:

belt driving means positioned at one end of an endless belt, which is one of at least an intermediate image transfer belt and a sheet conveying belt, and comprising a drive roller for moving said belt; and at least one photoconductive drum arranged side by side in a direction of movement of the belt and pressed against said belt either directly or indirectly to be thereby rotated by said belt;

wherein at least one of said drive roller and said photoconductive drum is directly driven by an outer rotor coreless motor;

wherein said outer rotor careless motor comprises an outer rotor functioning as said drive roller at a same time.

24. The apparatus as claimed in claim 23, wherein the outer rotor comprises an encoder disk on which is at least one of timing marks for sensing a signal for rotation control and a mark for sensing a signal that switches a phase of a current to be fed to each of different coil phases.

25. The apparatus as claimed in claim 24, wherein said mark functions as a mark for sensing a start signal output for each rotation at a same time.

26. An apparatus comprising:

belt driving means positioned at one end of an endless belt, which is one of at least an intermediate image transfer belt and a sheet conveying belt, and comprising a drive roller for moving said belt; and at least one photoconductive drum arranged side by side in a direction of movement of the belt and pressed against said belt either directly or indirectly to be thereby rotated by said belt;

wherein at least one of said drive roller and said photoconductive drum is directly driven by an outer rotor coreless motor;

wherein said outer rotor coreless motor comprises an outer rotor that is formed integrally with said drive roller.

27. The apparatus as claimed in claim 26, wherein the outer rotor comprises an encoder disk on which is at least one of timing marks for sensing a signal for rotation control and a mark for sensing a signal that switches a phase of a current to be fed to each of different coil phases.

28. An apparatus as claimed in claim 27, wherein said mark functions as a mark for sensing a start signal output for each rotation at a same time.

29. An apparatus comprising:

belt driving means positioned at one end of an endless belt, which is one of at least an intermediate image transfer belt and a sheet conveying belt, and comprising a drive roller for moving said belt; and at least one photoconductive drum arranged side by side in a direction of movement of the belt and pressed against said belt either directly or indirectly to be thereby rotated by said belt;

wherein at least one of said drive roller and said photoconductive drum is directly driven by an outer rotor coreless motor;

wherein said outer rotor coreless motor is driven such that timings for feeding currents to coils of different phases substantially do not overlap each other when a flux density of a magnetic field is substantially constant.

30. The apparatus as claimed in claim 29, wherein the outer rotor comprises an encoder disk on which is at least one of timing marks for sensing a signal for rotation control and a mark for sensing a signal that switches a phase of a current to be fed to each of different coil phases.

31. The apparatus as claimed in claim 30, wherein said outer rotor coreless motor comprises an outer rotor that is formed integrally with said drive roller.

32. The apparatus as claimed in claim 30, wherein said mark functions as a mark for sensing a start signal output for each rotation at a same time.

33. An apparatus comprising:

belt driving means positioned at one end of an endless belt, which is one of at least an intermediate image transfer belt and a sheet conveying belt, and comprising a drive roller for moving said belt; and at least one photoconductive drum arranged side by side in a direction of movement of the belt and pressed against said belt either directly or indirectly to be thereby rotated by said belt;

wherein at least one of said drive roller and said photoconductive drum is directly driven by an outer rotor coreless motor;

wherein the outer rotor comprises an encoder disk on which is at least one of timing marks for sensing a signal for rotation control and a mark for sensing a signal that switches a phase of a current to be fed to each of different coil phases.

34. The apparatus as claimed in claim 33, wherein said mark functions as a mark for sensing a start signal output for each rotation at a same time.

* * * * *